(12) United States Patent
Smith et al.

(10) Patent No.: US 7,096,416 B1
(45) Date of Patent: Aug. 22, 2006

(54) METHODS AND APPARATUSES FOR SYNCHRONIZING MIXED-MEDIA DATA FILES

(75) Inventors: Timothy J. Smith, San Jose, CA (US); Brad Silen, Sausalito, CA (US)

(73) Assignee: Autovod, Keller, TX (US)

( * ) Notice: Subject to any disclaimer, the term of this patent is extended or adjusted under 35 U.S.C. 154(b) by 621 days.

(21) Appl. No.: 09/699,798

(22) Filed: Oct. 30, 2000

(51) Int. Cl.
*G06F 17/21* (2006.01)
*G06F 17/27* (2006.01)
*G06F 17/24* (2006.01)

(52) U.S. Cl. .............................. 715/500.1; 715/501.1; 715/512; 715/513; 715/530; 715/704; 715/719; 715/721

(58) Field of Classification Search ............. 715/500.1, 715/500, 501.1, 512, 513, 530, 704, 719, 715/721; 345/704, 719, 721
See application file for complete search history.

(56) References Cited

U.S. PATENT DOCUMENTS

| | | | | |
|---|---|---|---|---|
| 5,530,859 A | * | 6/1996 | Tobias et al. ............... | 713/400 |
| 5,815,689 A | * | 9/1998 | Shaw et al. ................. | 713/400 |
| 5,826,102 A | * | 10/1998 | Escobar et al. ........... | 715/500.1 |
| 6,006,241 A | * | 12/1999 | Purnaveja et al. .......... | 715/512 |
| 6,357,042 B1 | * | 3/2002 | Srinivasan et al. .......... | 725/32 |
| 6,642,966 B1 | * | 11/2003 | Limaye ...................... | 348/473 |
| 6,665,835 B1 | * | 12/2003 | Gutfreund et al. ....... | 715/500.1 |

OTHER PUBLICATIONS

Microsoft Press, Microsoft Press Computer Dictionary, Microsoft Press, Third Edition, p. 299.*

* cited by examiner

*Primary Examiner*—Stephen Hong
*Assistant Examiner*—Joshua D Campbell
(74) *Attorney, Agent, or Firm*—Knobbe, Martens, Olson & Bear, LLP

(57) ABSTRACT

A method for synchronizing mixed-media data files that comprises receiving a streaming media file, receiving a static media file, producing a streaming output from the streaming media file, querying the streaming output for a time marker upon receiving an input, and associating the static media file with the time marker and the streaming media file in an output file. An apparatus for synchronizing mixed-media data files that comprises a computer system including a database with one or more data structures relating to streaming media files and static media files stored on a storage device. The computer system also includes an application program coupled to the database that is configured to execute the methods described above.

21 Claims, 14 Drawing Sheets

METHODS AND APPARATUSES FOR SYNCHRONIZING MIXED-MEDIA DATA FILES

BACKGROUND

1. Field of the Invention

The invention relates generally to the field of media presentation, and more particularly to methods and apparatus for synchronizing media files.

2. Background Information

A mixed-media file presentation system is a presentation system that simultaneously presents different media elements, such as video, audio, images, and text. FIG. 1 illustrates such a mixed-media file presentation system as the display screen of a computer, which is one means for delivering a mixed-media file presentation. The mixed-media file presentation system of FIG. 1 comprises a frame and background 106 that hold a variety of media elements. In this particular example, there is a video element 100, a static image element 102, and a text element 104 in the form of subtitles. When the mixed-media file presentation system is in use, the video plays while the slides and subtitles change. The system may also present animations or simulations.

In order for the mixed-media presentation to flow smoothly, it is necessary to synchronize the different media elements so that they will be presented at the correct moment in the presentation. For instance, the presentation can consist of a video of a person giving a lecture, slides to which the lecturer refers, and subtitles that display what the lecturer is saying in any of a number of languages.

The presentation system must display the slides at the correct moment in the lecture, and it must correctly present subtitles while the video is playing. The presentation must correctly associate these media elements to one another.

According to the present state-of-the-art, methods exist for achieving this type of synchronization. In a known embodiment, data is physically embedded for the slides and subtitles into the actual video data file. For example, a user will embed Universal Record Locators ("URLs") at locations within the video data file that are links to the slides or subtitles, or the user will place URLs at the front of the video data file and embed markers into the video data file at various locations in the data stream. The embedded URLs or markers appear at locations in the video data file that correspond to when the slides and subtitles are to appear.

A drawback to the above approach is that it is destructive and therefore makes reuse of the files a problem. By stating that this method is destructive, it is meant that it permanently changes the video data file (for instance). Later, if it is desired to reuse some portion of the previous files, then the user must start from scratch and embed new data into a fresh video data file.

Notwithstanding the destructive nature of such a system, the method for making changes to a mixed-media file presentation system discussed above is time-consuming and tedious: users often must carefully watch and time a video as it plays to know where to embed the slide and subtitle data.

SUMMARY OF THE INVENTION

The invention is a method and apparatus for synchronizing media files in a non-destructive manner. According to an aspect, the invention enables changes to be made to a mixed-media presentation without creating a new video data file.

According to one embodiment, a method for synchronizing mixed-media data files comprises receiving at least one streaming media file, receiving at least one static media file, processing the streaming media file to produce a streaming output for a user, querying the streaming media file to acquire a time marker upon receiving a user input, and generating an output file that links the static media file with the time marker and the streaming media file. The time marker represents a point where the static media file is to be synchronized to the streaming media file. The output file can be used by a mixed-media file presentation system to synchronize the static media file with the streaming media file, or it can be used during the building of a mixed-media file presentation system.

In another embodiment, the invention is a computer system that includes a database comprising one or more data structures relating to streaming media files and static media files, and an application program coupled to the database that is configured to execute the method described above.

DETAILED DESCRIPTION OF THE INVENTION

Figure 1:
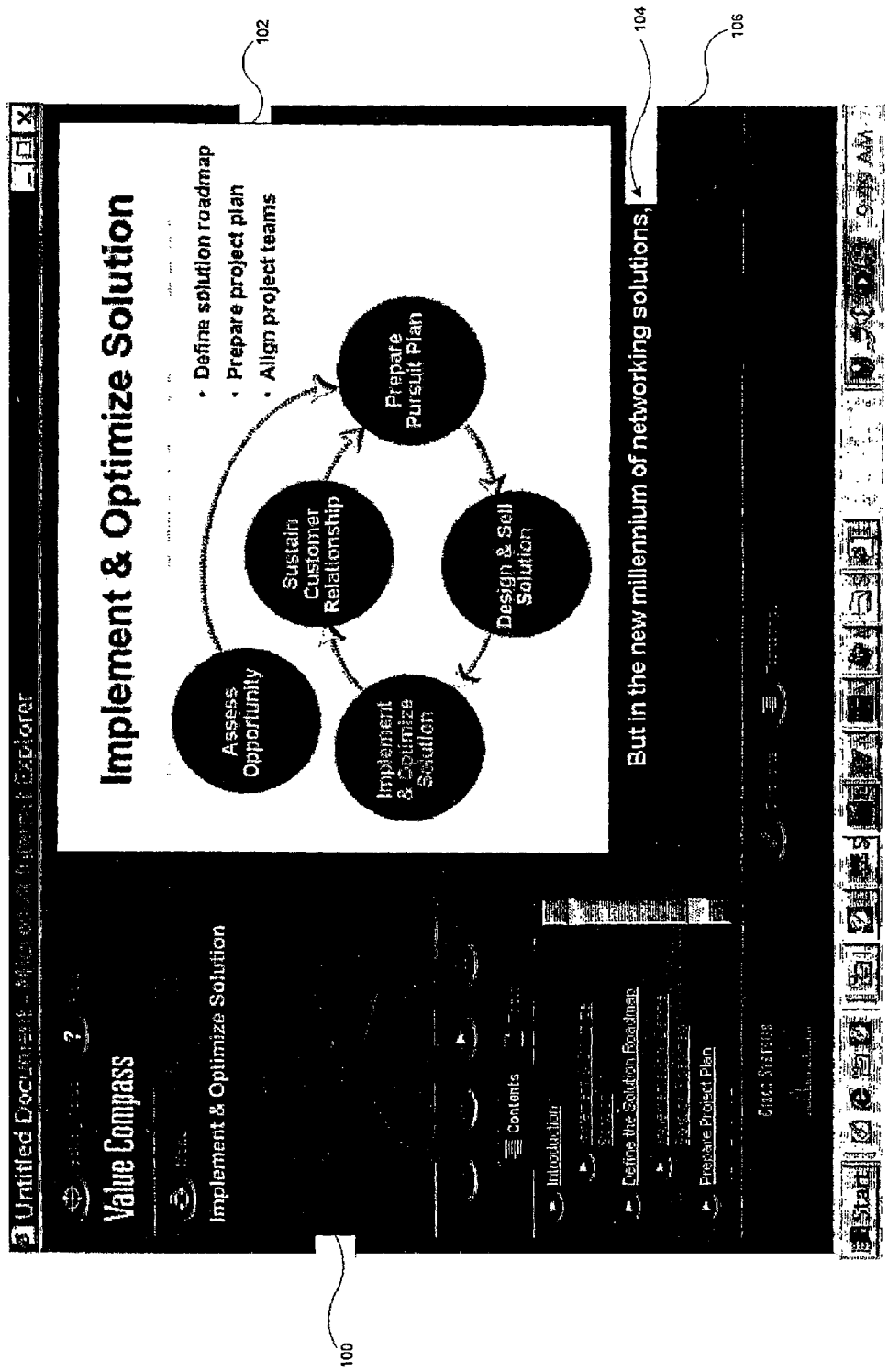
FIG. 1 is a mixed-media file presentation system as displayed on a monitoring device.

The invention is directed to methods and apparatuses for synchronizing media files to enable them to be concurrently presented in a mixed-media file presentation system. The apparatus of the invention, as well as the associated methods, utilize non-destructive techniques to synchronize media files, wherein static media files and transcript files synchronization to a streaming media file occurs without any destructive changes being made to the streaming media file itself. The invention allows for the synchronization of any types of static media files and transcript files, such as slides, subtitles, and other types of images or animations, with any type of streaming media file, such as video or audio.

1. Terminology

The term "media file" refers to data files that convey sensory information to a person, such as visual information or audible information. The visual information can take the form of videos, animations, simulations, graphics, images, and text. The audible information can take the form of any type of audio information, including human speech, sound effects.

The term "streaming media file" refers to media that is continuous in nature and that has a time component to it, such media primarily being video files and audio files. Streaming media files can be queried as they run to determine how much time has elapsed since they were started. Representative streaming media files include RealVideo files, RealAudio files, Quicktime files, MPEG files, Windows Media files, MP3 files, Wave files, and any other computer generated video and audio files.

The term "static media file" refers to media that is static in nature. Static media files include graphics files such as GIF images, JPEG images, Bitmap files, or Computer-Aided Design ("CAD") drawings, as well as animation files that do not have a time component, such as GIF animations or Flash animations. Static media files also include text files, such as Word documents, WordPerfect documents, Portable Document Files ("PDF"), and other computer generated text documents.

The term "mixed-media" refers to a combination of both streaming media and static media files.

The term "transcript file" refers to a static media text file used as a speech transcript during a streaming presentation. Transcript files can be in any of the text formats described herein, and can also be in a standard generalized markup language ("SGML"), such as hypertext markup language ("HTML") format. Transcript files are a subset of static media files, but are herein generally referred to separately because the invention often handles transcript files differently than other static media file types. For example, the methods and apparatus of the invention use the transcript files to create subtitles for mixed-media presentations.

The term "time marker" refers to a numerical or other symbolic value obtained from a streaming media file when the streaming media file is queried. The numerical value generally represents a quantity or unit of time that has elapsed as measured from the starting point of the streaming media file to the point where the streaming media file was queried, or since the last time marker.

The term "server" refers to software on a computer system or device on a network that receives and answers requests for information. Typically, the computer system is also dedicated to storing data files and managing network resources, including network traffic. The computer system or device generally includes a processor and a data storage device, and is typically connected to the Internet.

2. Network Architecture Overview

Figure 2:
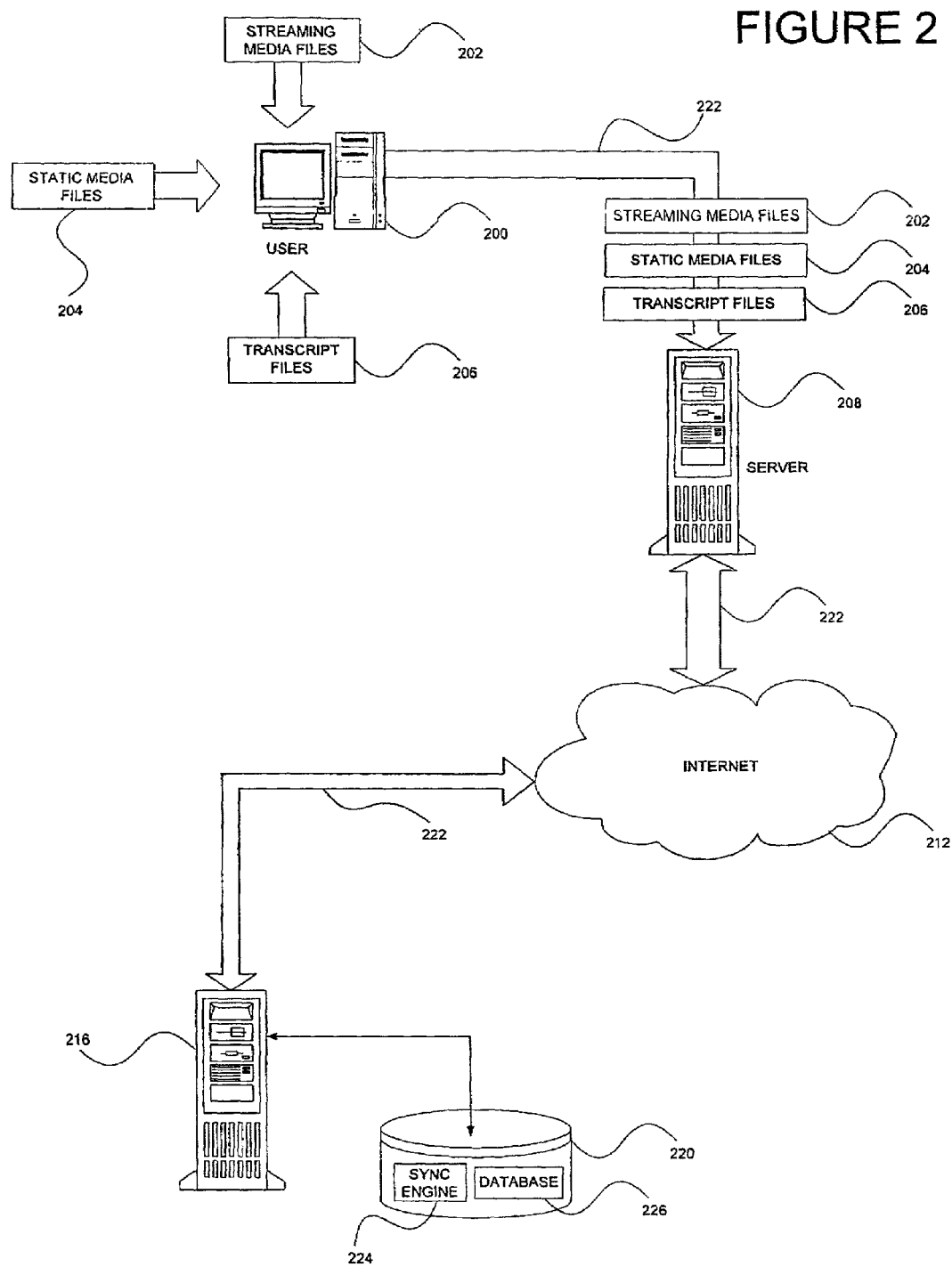
FIG. 2 illustrates a network architecture in which the invention can be deployed.

FIG. 2 depicts a network architecture in which the invention can be employed. Generally, a user creates media files on a computer system 200 and transfers them to a synchronization server 216 that carries out the methods described herein. The media files include streaming media files 202, static media files 204, and transcript files 206. A communications network, such as the Internet 212, carries out the transmitting of media files using communication lines 222. These communication lines 222 can comprise phone lines, ISDN lines, cable lines, T-1 lines, T-3 lines, E-1 lines, or any other communication lines used to transfer data. Other communications networks, including local area networks (e.g. company intranets) or point-to-point connections can be used as well.

To move the media files to synchronization server 216, it is preferred that the user first upload static media files 204, transcript files 206, and streaming media files 202 to a server 208. Server 208 has a link to a communications network, such as the Internet 212, via communication lines 222. By placing the media files on server 208, synchronization server 216 can access the media files whenever necessary to carry out the methods without having to exhaust it's own data storage space to store these media files. In addition, the use of server 208 is preferred because if the media files are resident on the user computer system 200, synchronization server 216 only has access to the media files when the user computer system 200 is powered up and connected to the Internet. Server 208 can be owned and operated by an ISP, or can belong to the user.

Synchronization server 216 carries out the methods of the invention using streaming media files 202, static media files 204, and transcript files 206 created by the user. Synchronization server 216 comprises a computer system, such as computer system 200.

Data storage device 220 in the synchronization server 216 preferably stores a sync engine 224. Sync engine 224 is a computer program comprising one or more sequences of instructions that cause a processor to perform a number of acts in accordance with the methods described herein. It is also preferred that the data storage device 220 stores a database 226, which is discussed in further detail below.

There are several alternate embodiments of the invention. For instance, the streaming media files 202 can be stored on a streaming server, on synchronization server 216, or on a user computer system 200, instead of on server 208. A streaming server is a server that uses specially-designed hardware and/or software to quickly and efficiently move streaming media files, which generally have large file sizes.

In other embodiments, the static media files 204 can be stored on the synchronization server 216 or a user computer system 200, instead of on server 208. Generally, the issues that will govern where streaming media files 202 and static media files 204 are stored concern available storage space at the various servers or systems, availability of the files when stored at the different locations, and available bandwidth.

In another embodiment, the computer system 200 can entirely carry out the methods of the invention. In this embodiment, sync engine 224 and database 226 reside on the user computer system 200, and the use of servers, communication lines, and the Internet is avoided.

3. Method for Synchronizing Mixed-Media Files

Figure 3:
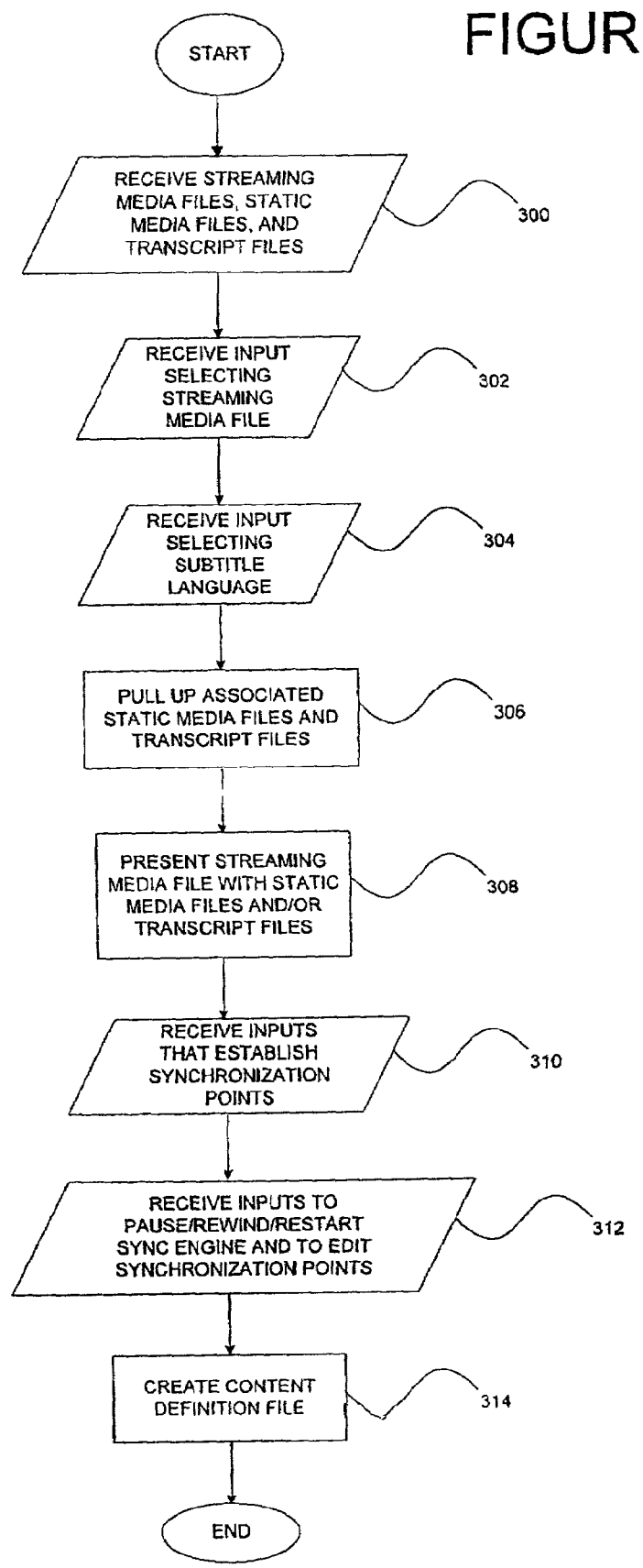
FIG. 3 is a flowchart depicting overall steps for synchronizing media files according to an embodiment of the invention.

FIG. 3 is a flowchart detailing a conceptual overview of synchronizing media files. Sync engine 224 first receives streaming media files 202, static media files 204, and transcript files 206 (box 300). The transcript files 206 are used by the sync engine 224 to create subtitles for the mixed-media presentation.

Next, as shown in box 302, the sync engine 224 receives a system input that selects which streaming media file 202 to use for the synchronization process. Moving to box 304, the sync engine 224 then receives a system input that selects which transcript language to use when creating subtitles for the mixed-media presentation.

Next, as seen in box 306, the sync engine 224 retrieves static media files 204 and the appropriate transcript files 206 associated with the selected streaming media file 202. This act can also depend on the transcript language chosen. Sync engine 224 includes information regarding which static media files 204 and which transcript files 206 are associated with each streaming media file 202. The information is based on relationships specified prior to use of sync engine 224. The process of creating relationships between media files is further described below with reference to FIGS. 10 and 11.

Turning to box 308, the synchronization process is started. The sync engine 224 concurrently plays streaming media file 202 and displays one or more static media files 204. Alternatively, or in combination with the above playback, one or more portions of transcript files 206 can be played. In one embodiment, the sync engine 224 preferably links and serves the files, while a client (e.g., X-server or other server application) actually transmits the data to the end user. The sync engine 224 can also be implemented so that the sync engine 224 actually serves the streaming media files 202 and/or the static media files 204. Next, as shown in box 310, as the streaming media file 202 is playing, the sync engine 224 receives system inputs that establish synchronization points. As used herein, the term "synchronization point" refers to a specific point in time during the presentation of a streaming media file 202 at which a particular static media file 204 or subtitle is made to appear. Thus in a completed mixed-media presentation, for example the mixed-media presentation of FIG. 1, as a streaming media file (e.g. video) plays in section 100, each static media file (e.g. slides) or subtitle appears within sections 102 or 104 when its respective synchronization point has been reached. By the end of the presentation, all of the slides or subtitles will have cycled through and appeared in sections 102 or 104.

Turning to box 312, the sync engine 224 enables the user to pause, rewind, and replay the streaming media file 202. In this manner, the user is able to see where the static media files 204 and subtitles were synchronized to the streaming media file 202. Furthermore, the user is enabled to modify where the media files were synchronized. Moreover, these characteristics allow the user to see if the subtitles were created logically.

Sync engine 224 next generates an output file that contains synchronization data, as shown in box 314. This output file is referred to herein as a "content definition file". A computer program can use the content definition file to build a mixed-media file presentation system, or a mixed-media file presentation system can directly use the content definition file to synchronize media files. The content definition file is described in greater detail with reference to FIGS. 6A and 6B.

Figure 4:
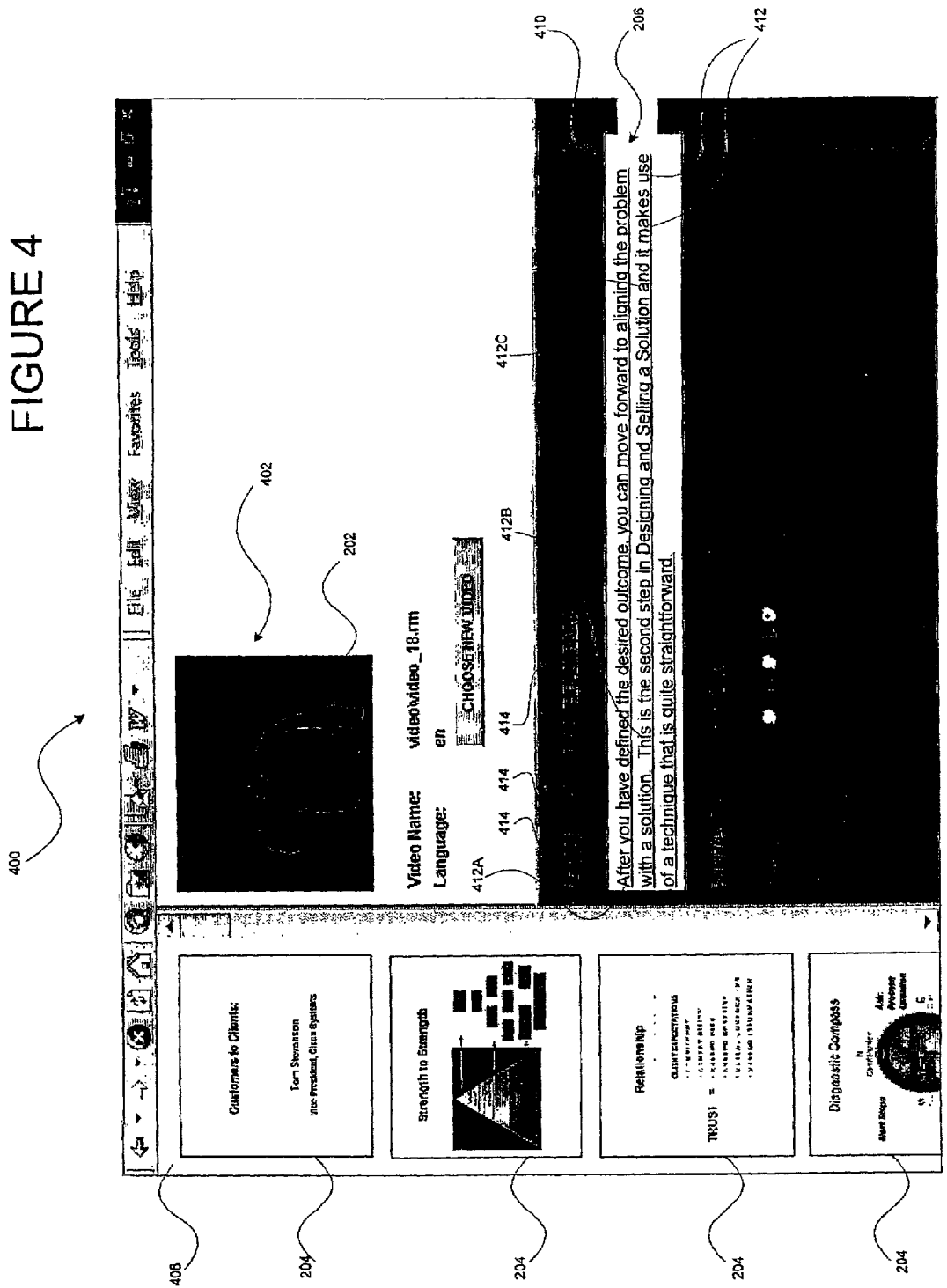
FIG. 4 illustrates an embodiment of a user interface for the sync engine.

FIG. 4 illustrates an embodiment of a user interface 400 that provides a means for a user to interact with sync engine 224. User interface 400 includes a section 402 where a streaming media file 202 is displayed, a section 406 where one or more static media files 204 are displayed, and a section 410 where one or more transcript files 206 are displayed. Within user interface 400, the transcript files 206 appear in a markup format, shown by each underlined word 412. User interface 400 also includes control buttons 414 for controlling whether streaming media file 202 is playing, paused, or restarted.

According to an embodiment, user interface 400 is designed to run within a web browser, such as Netscape Navigator (obtainable at www.netscape.com) or Microsoft Internet Explorer (obtainable at www.microsoft.com). Such a user interface 400 allows the sync engine 224 to be accessed from remote locations and run over a communications network. Thus, a user on computer system 200 can use the sync engine 224, located on the synchronization server 216, from virtually any location in the world.

Figure 5A:
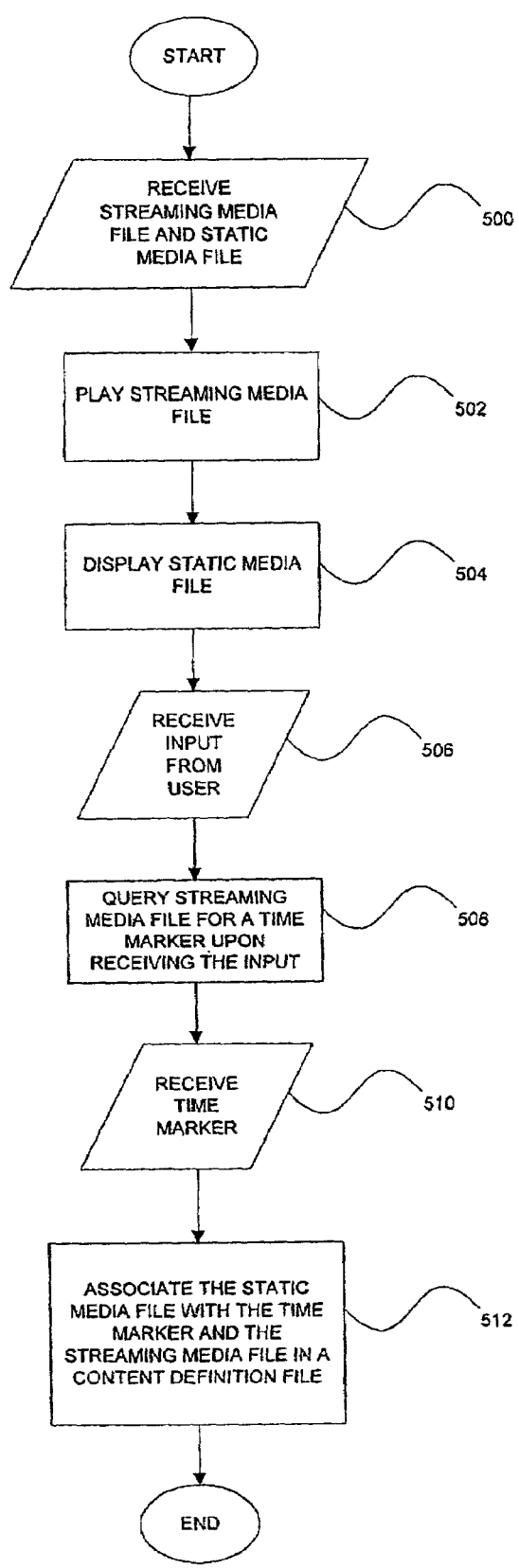
FIG. 5A is a flowchart depicting steps for synchronizing static media files to a streaming media file according to an embodiment of the invention.

Turning to FIG. 5A, a flowchart is shown that describes an embodiment of the method for synchronizing a static media file to a streaming media file. Starting with box 500, the sync engine 224 first receives streaming media file 202 and static media file 204. The next steps, shown in boxes 502 and 504, concurrently present the streaming media file 202 and the static media file 204 on a display device. The streaming media file 202 is handled by a processor 204 that, in turn, produces a streaming output. The streaming output is the actual video that is displayed on a display screen or the actual audio that is delivered through a speaker. Thus, a user can see a streaming output such as a video playing in section 402 of the user interface in FIG. 4, while static media file 204 appears in section 406 of the interface 400.

Next, the user establishes a synchronization point to which the static media file 204 is matched. Sync engine 224 is the tool used for this process, and the user interacts with sync engine 224 via user interface 400. Referring to FIG. 4 in conjunction with box 506 of FIG. 5A, as the streaming media file 202 plays within section 402 of interface 400, the user is allowed to establish a synchronization point by "selecting" static media file 204 at the precise moment the user wants the file 204 to appear during the presentation. This "selection", which is simply an input by the user, can be accomplished in a number of ways. A preferred way is using a mouse to place a pointer over static media file 204 and having the user "click" on static media file 204 at the moment the synchronization point is to be established. This same process can be carried out using a keyboard. The sync engine 224 then receives this input from the user, as shown in box 506.

This process is best illustrated by an example. Consider that a user wants the first slide 204 shown in FIG. 4 (the "Customers to Clients" slide) to appear thirty seconds into streaming video 202. The user starts the video and uses a mouse to place a pointer over the "Customers to Clients" slide 204. After thirty seconds of the video has elapsed, the user "clicks" on the "Customers to Clients" slide 204, thereby establishing a synchronization point. Now when the completed mixed-media presentation is shown, the "Customers to Clients" slide appears on-screen thirty seconds after the video has begun. The user can synchronize all of the slides in this manner, thus making all of the slides appear at appropriate times during the video. It is worth noting that the invention can synchronize any type of static media file to any type of streaming media file in this manner.

Moving on to box 508 of FIG. 5A, when an input is received sync engine 224 queries streaming media file 202 to obtain a time marker. Upon receiving this query, streaming media file 202 generates a time marker and sends it to sync engine 224. The time marker indicates how much "run time" has elapsed since the start of the streaming media file. As used herein, the term run time refers to a quantity of time that has elapsed since the start of the streaming media file, taking into account only the actual playing of the streaming media and not including time incurred due to pauses, rewinds, and fast forwards.

Next, the sync engine receives the time marker (box 510) and generates a content definition file (box 512). The content definition file contains the time marker along with information about the static media file 204 and the streaming media file 202. The content definition file is further described below with reference to FIG. 6.

Figure 5B:
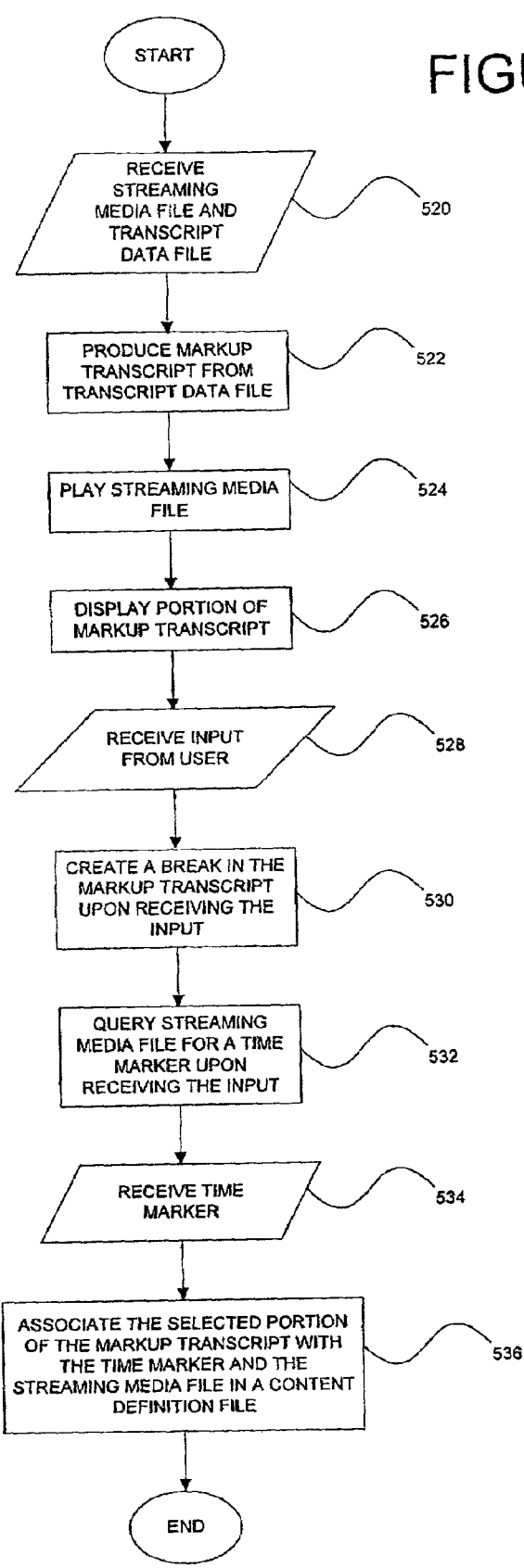
FIG. 5B is a flowchart depicting steps for synchronizing transcript files to a streaming media file and creating subtitles according to an alternate embodiment of the invention.

Turning now to FIG. 5B, a flowchart is provided that describes a method for creating subtitles from transcript files 206 and synchronizing those subtitles to a streaming media file.

Starting with box 520, the first step in this process is for the sync engine 224 to receive streaming media file 202 and transcript file 206. Turning to box 522, the next step is to convert the individual words of the transcript files into a markup format, such as an HTML format.

The process of converting the transcript files 206 into markup words 412 can be accomplished in a number of ways. A preferred method is to use a computer program, such as a Perl script, to extract each word from the transcript files 206 and re-write each word in an HTML format using anchor tags. This markup process can also be performed using different markup languages.

Moving to boxes 524 and 526 of FIG. 5B, the next step in synchronizing the transcript files 206 and creating subtitles is to present streaming media file 202 as a streaming output while concurrently displaying portions of the one or more transcript files on a display device. Here a user can see the streaming output, such as a video, playing in section 402 of user interface 400, while markup words 412 of the transcript files 206 appear in section 410 of interface 400.

Having the words 412 in markup format allows a user to "select" individual words to synchronize to streaming media file 202. Moreover, it allows the user to designate breaks in the transcript that correspond to the starting and ending points for the subtitles.

Turning to box 528, the sync engine 224 receives inputs that establish synchronization points to which the transcript files 206 are matched and designate the start and end of subtitles. Reviewing FIG. 4 in conjunction with box 528 of FIG. 5B, as streaming media file 202 plays within section 402 of interface 400, the user is allowed to "select" a markup word 412 of the transcript file 206 at the precise moment the user wants that word to appear as the start of the next subtitle.

An example is now provided to illustrate this process.

Using the markup words 412 in FIG. 4, suppose a user wants the following subtitles to be presented at the beginning of the mixed-media presentation:

1. "After you have defined the desired outcome, you can move forward to aligning the problem with a solution."
2. "This is the second step in Designing and Selling a Solution."
3. "and it makes use of a technique that is quite straightforward."

To create and synchronize subtitles, the user "selects" the first word of each of the subtitles at appropriate times during the playing of streaming media file 202. So as the lecturer in the streaming video 202 speaks the word "After", the user "selects" markup word "After" 412A. This action establishes a synchronization point for the word "After" 412A, and designates the word "After" 412A as the start of the first subtitle.

Next, as the lecturer speaks the word "This", the user "selects" markup word "This" 412B, again establishing a synchronization point for the word "This" 412B and designating the start of the second subtitle. All of the words between "After" 412A and "This" 412B appear in the first subtitle.

Finally, when the lecturer speaks the word "and", the user "selects" markup word "and" 412C to again establish a synchronization point and designate the start of the third subtitle. As before, the words between "This" 412B and "and" 412C appear in the second subtitle. The words after "and" 412C appear in the third subtitle. Now when the completed mixed-media presentation is shown, each of the subtitles appear on-screen at the moment that the lecturer in the video speaks the first word of each subtitle.

Moving on to box 530 of FIG. 5B, when sync engine 224 receives an input "selecting" a markup word 412, sync engine 224 creates a break in the markup transcript file 206 to signify the starting point of a subtitle. At approximately the same time, as shown in box 532, sync engine 224 obtains a time marker. The sync engine 224 receives this time marker (box 534) and places it into a content definition file with information describing the transcript file 206 and the streaming media file 202 (box 528).

Figure 6A:
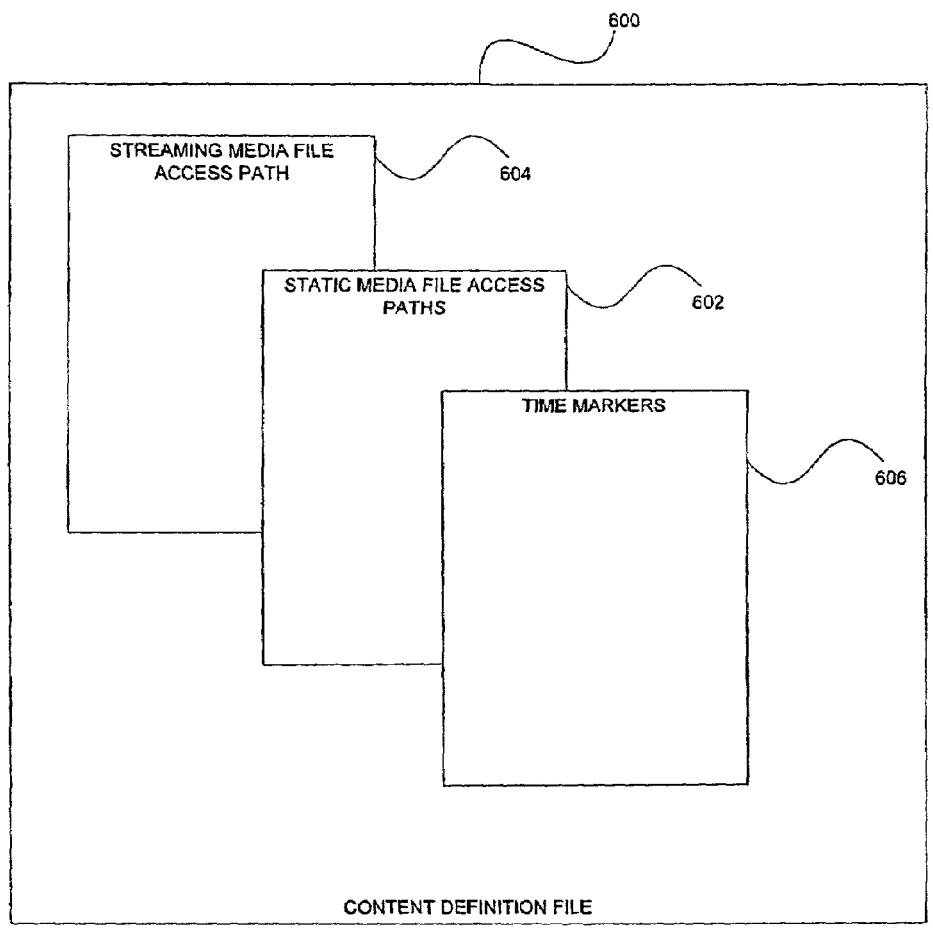
FIG. 6A depicts a content definition file containing information related to a static media file.
Figure 6B:
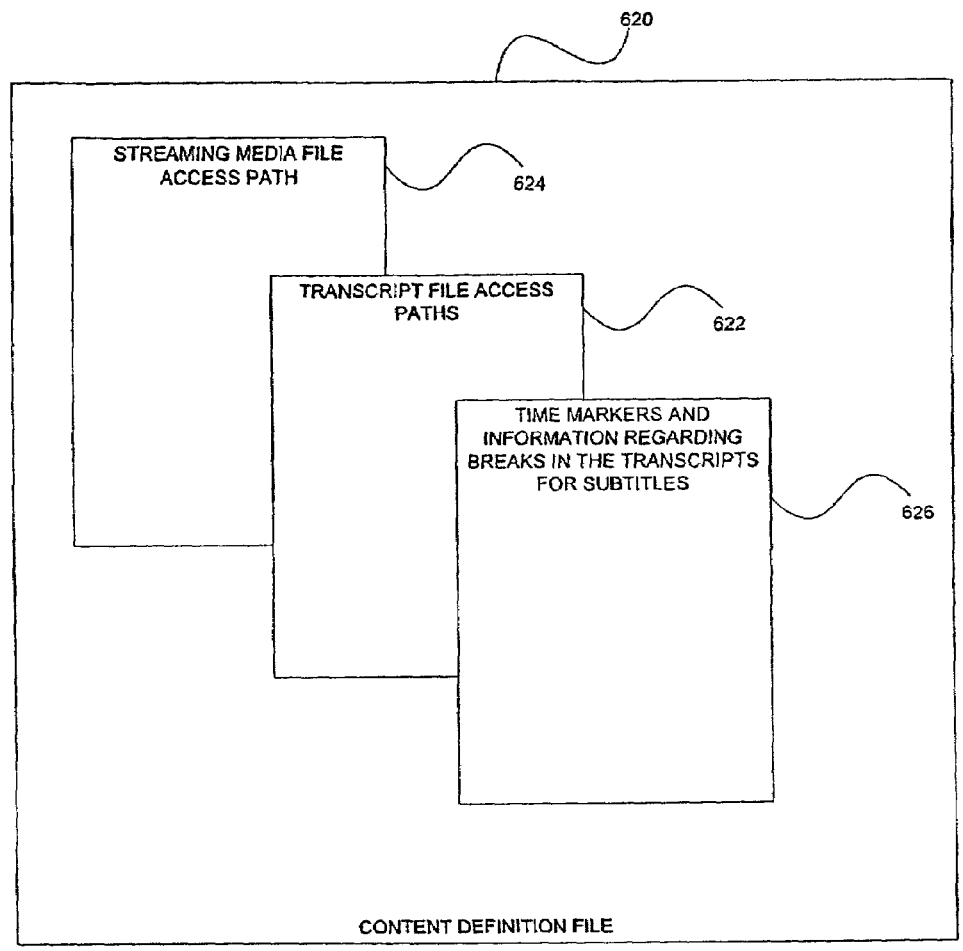
FIG. 6B depicts a content definition file containing information related to a transcript file.

FIGS. 6A and 6B are graphical representations of content definition files. Content definition file 600 of FIG. 6A is for a static media file 204. This content definition file 600 includes information 602 related to the static media file 204 for which the time marker was generated (e.g. access path information), information 604 relating to streaming media file 202 from which the time marker was obtained (e.g. access path information), and the time marker data 606 itself. Content definition file 600 therefore associates static media file 204 to streaming media file 202, and includes a time marker that designates when static media file 204 is supposed to appear while streaming media file 202 is served. Typically one content definition file includes data for a plurality of static media files.

Content definition file 620 of FIG. 6B includes information 622 relating to the transcript file 206 for which the time markers were generated, information 624 relating to streaming media file 202 from which the time marker was obtained, and time marker data 626 from sync engine 224 that was generated by streaming media file 202. Content definition file 620 also includes information 626 related to breaks in the transcript files 206 that designate the starting and ending points for the subtitles that were created. Similar to content definition file 600 of FIG. 6A, content definition file 620 associates the transcript file to streaming media file 202, and includes time markers that designate when each subtitle is to appear while streaming media file 202 is served.

Content definition files 600 and 620 can be used during the building of a mixed-media presentation. For example, a computer program designed to create mixed-media presentations can utilize the information provided by content definition files 600 and 620 during the generation of the mixed-media presentation. Content definition files 600 and 620 can also be dynamically used by a mixed-media presentation while such a presentation is being served back on a display device.

Figure 7:
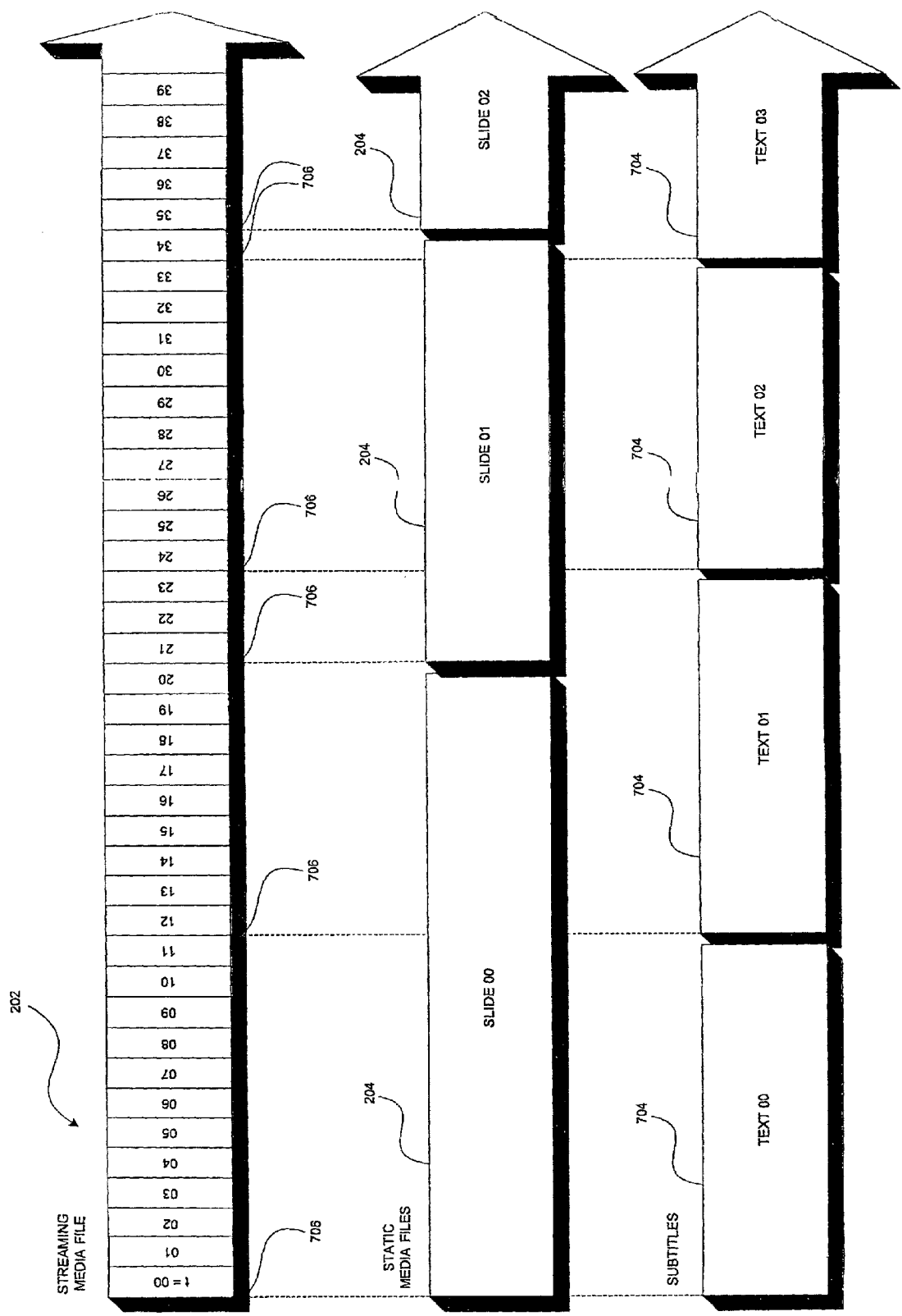
FIG. 7 depicts the relationship between the static media files and the transcript files as synchronized to the streaming media file.

Turning to FIG. 7, a graphical representation of how the invention synchronizes a streaming media file 202, several static media files 204, and several subtitles 704 of a transcript file 206 is shown. Static media files 204 and subtitles 704 are synchronized to several different synchronization points 706 along streaming media file 202. So as streaming media file 202 plays and time 808 elapses, each synchronization point 706 is triggered causing a static media file 204 or a subtitle 704 to appear in the mixed-media presentation.

According to one embodiment, sync engine 224 resides on a portable storage medium such as a floppy disk or a CD-ROM. This allows sync engine 224 to be used on computer systems other than synchronization server 216. In another embodiment, sync engine 224 can reside on storage device 210 of a computer system 200 of the user. This allows a user to use sync engine 224 at their home or office without the need for a link to a communications network such as the Internet.

In another embodiment, a JavaScript timer is used to measure the elapsed time as the streaming media file 202 when there is no conventional streaming media file (e.g. video or audio) being used in the mixed-media presentation. Static media files 204 and/or transcript files 206 can then be synchronized to the JavaScript timer using the methods described herein.

Alternately, user action can be used to synchronize the static media files 204. For instance, a user can input a request to have the next static media file 204 presented by clicking on a markup "Next Page" button on a computer display screen.

In another alternate embodiment, the content definition files can be produced manually rather than by the sync engine 224. A user, such as a computer programmer, can create the content definition files by inserting data related to the streaming media file 202, the static media file 204 and/or the transcript file 206, and the time marker data.

Figure 8:
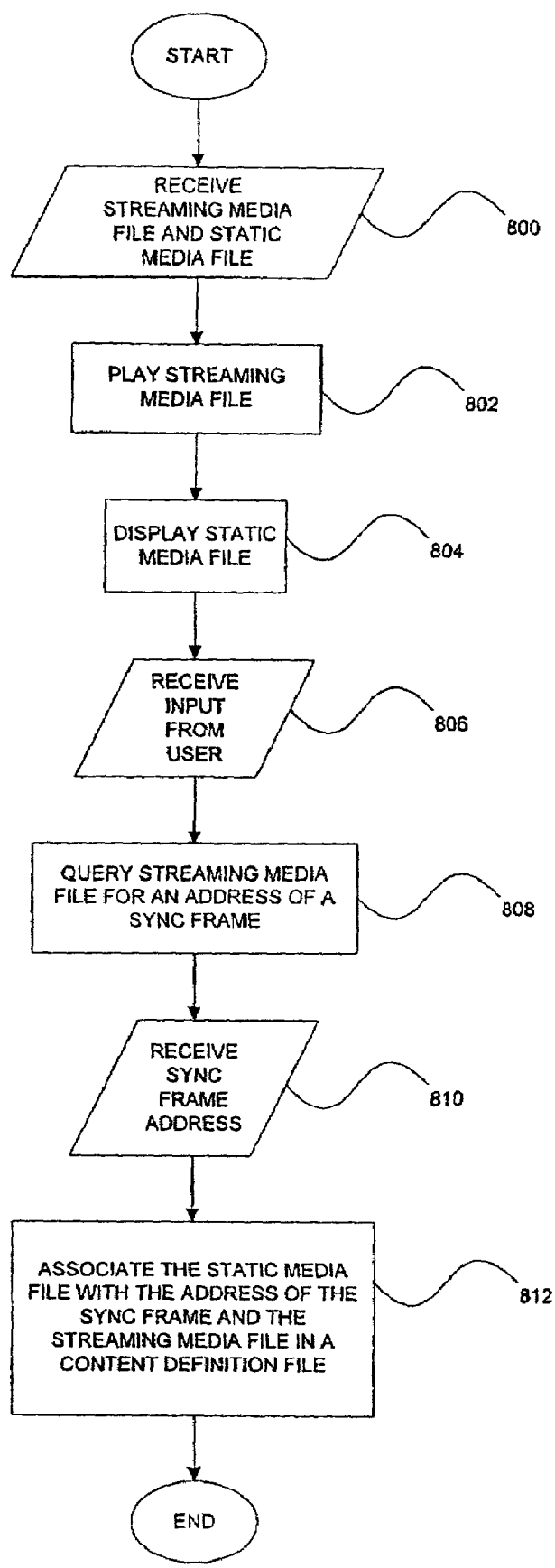
FIG. 8 is a flowchart depicting an alternate method for synchronizing media files.
Figure 9:
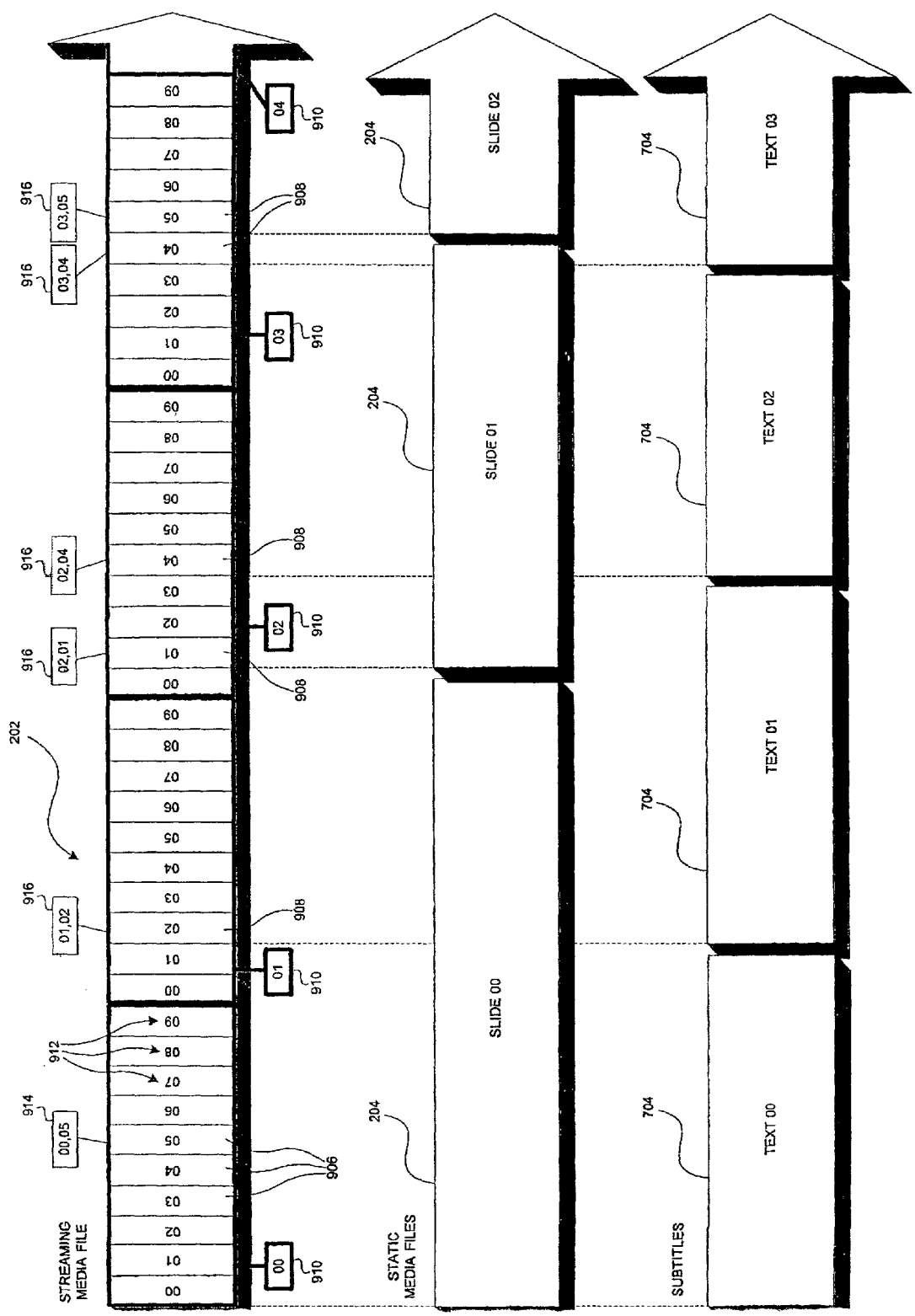
FIG. 9 is a graphical representation of the alternate method of synchronizing media files shown in FIG. 8.

FIG. 8 is a flowchart describing an alternative embodiment for synchronizing media files, while FIG. 9 is a graphical representation of how a streaming media file 202, several static media files 204, and several subtitles 704 are synchronized in accordance with this embodiment.

Turning to FIG. 9, streaming media file 202 comprises a series of frames 906, each frame 906 having a unique address. The unique address generally comprises a block number 910 and a frame number 912. For example, frame number 05 of block number 00 has a frame address 914 that comprises a combination of those numbers, such as "00,05" or "0005". The system can then identify a specific frame 906 by locating the block 910 it is contained in, and then finding the frame 912 with the correct frame number.

Turning to box 800 of FIG. 8, the sync engine 224 first receives streaming media file 202 and static media file 204. Next, as shown in boxes 802 and 804, the sync engine 224 plays streaming media file 202 while concurrently displaying static media files 204. Again, the streaming media file 202 is presented as a streaming output after being handled by a processor 204.

Moving to box 806, the sync engine 224 receives an input that establishes a synchronization point. When this input is received, as shown in box 808, sync engine 224 queries streaming media file 202 to obtain a sync frame. As used herein the term "sync frame" refers to a frame 906 of the streaming media file 202 that is in use (i.e. being served) at the moment the sync engine 224 receives the input. Upon receiving this query, streaming media file 202 identifies a sync frame and sends its unique address to sync engine 224. Then as shown in boxes 810 and 812, sync engine 224 receives the sync frame information and generates a content definition file containing the sync frame's unique address as well as information about the static media file 204 and streaming media file 202.

This embodiment can also be used to synchronize transcript files to a streaming media file 202 and to create subtitles. In this embodiment, when the user "selects" a markup word 412 to create a synchronization point and to designate the start of the next subtitle, the sync engine 224 obtains a sync frame. As before, a content definition file is created storing this information.

Turning again to FIG. 9, static media files 204 and subtitles 704 are synchronized to several sync frames 908 along streaming media file 202. Each sync frame 908 has a unique address 916. As streaming media file 202 plays and frames 906 elapse, each sync frame 908 is played causing a static media file 204 or a subtitle 704 to appear in the mixed-media presentation. It is the unique addresses 916 of the sync frames 908 that are stored in the content definition files by the sync engine 224.

4. Overall Process Flow for Building a Mixed-Media File Presentation System

Figure 10:
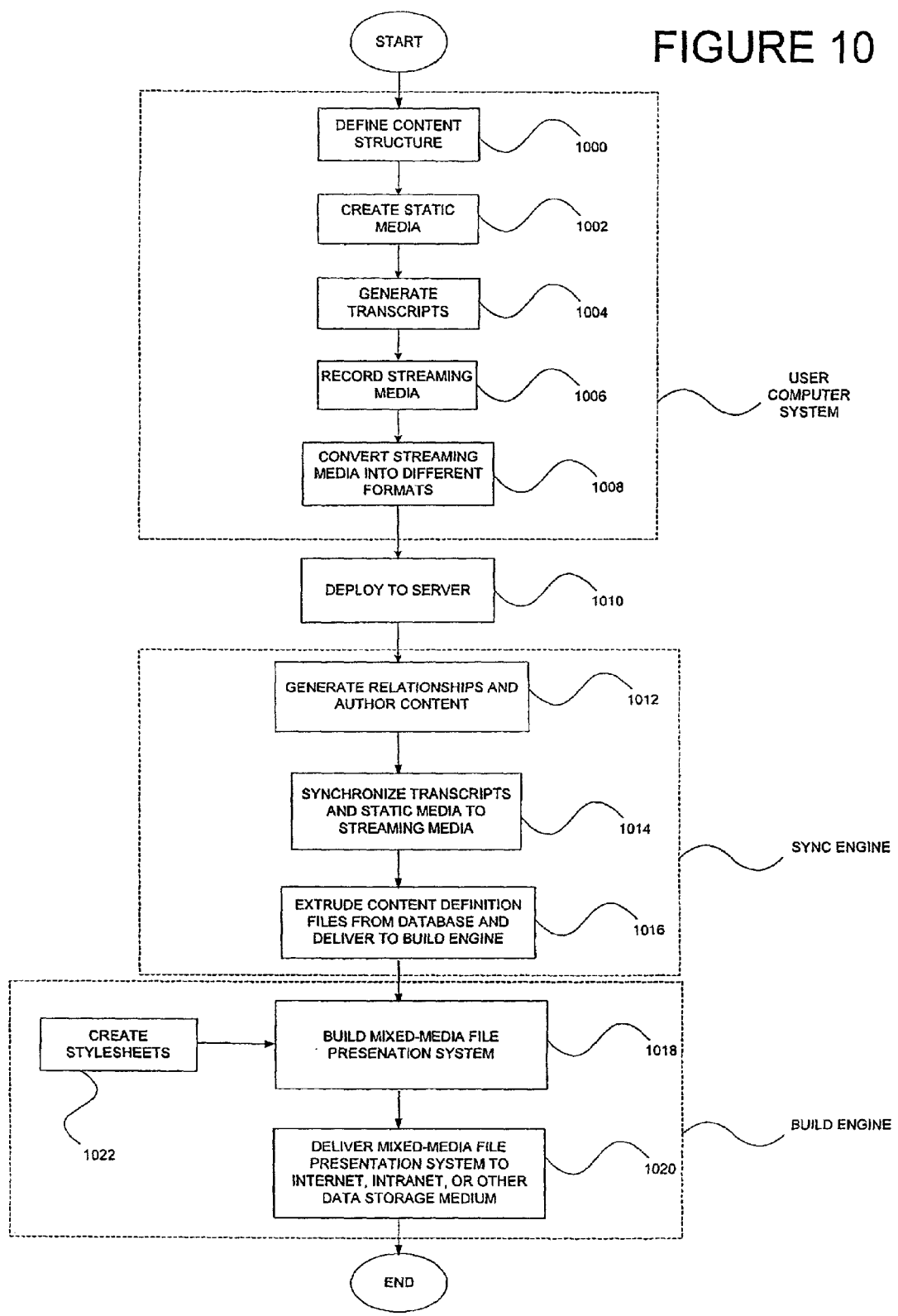
FIG. 10 is a flowchart illustrating how a mixed-media file presentation system is generated.
Figure 11:
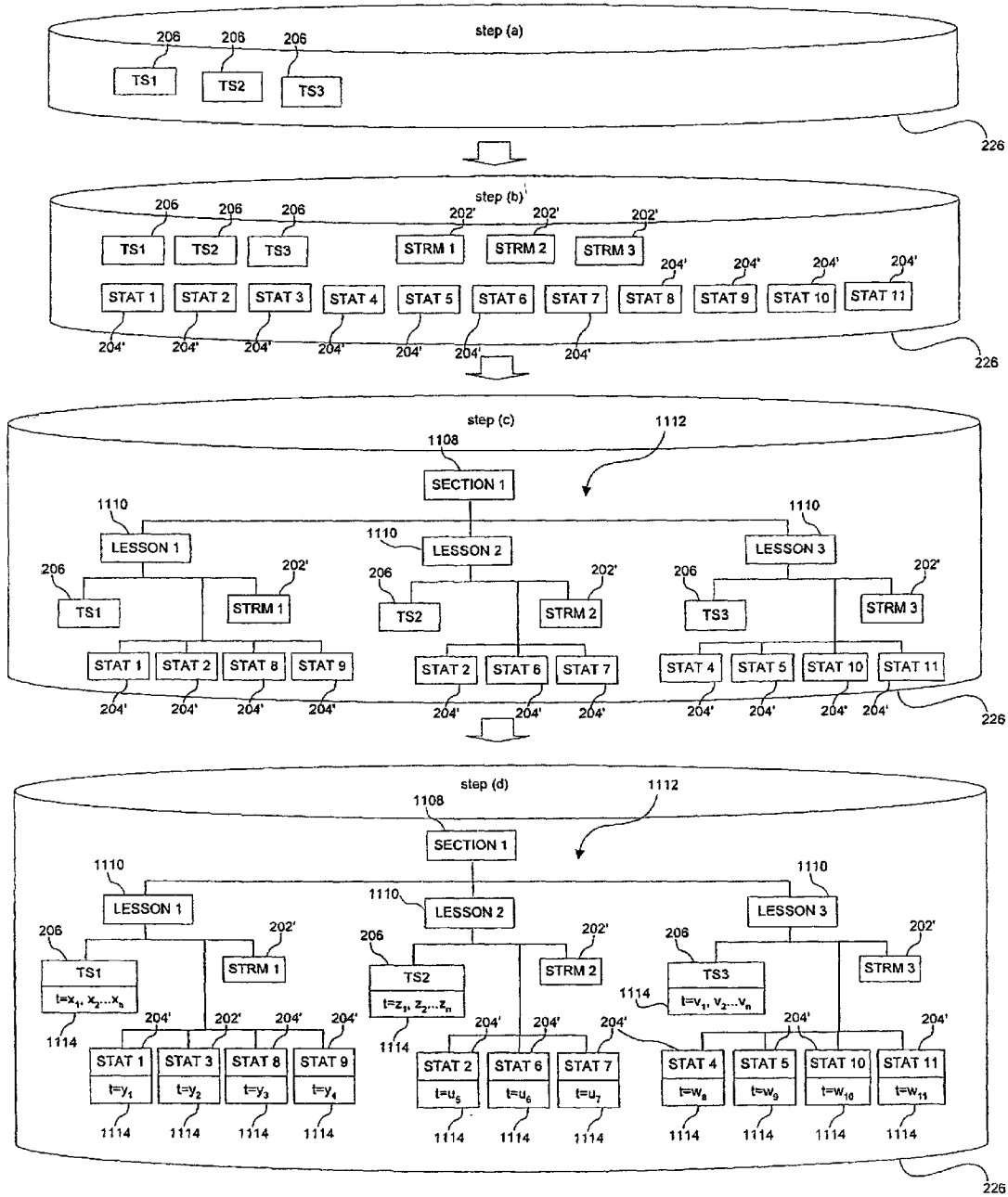
FIG. 11 illustrates how a database is built and modified in accordance with the overall process depicted in FIG. 10.

FIGS. 10 and 11 illustrate the process for building a mixed-media file presentation system. FIG. 10 is a flowchart describing how a mixed-media file presentation system is generated. FIG. 11 illustrates how database 226, within the synchronization server 216, is built and modified as the process is carried out.

Starting at box 1000 of FIG. 10, a user begins by defining the content structure of the presentation. The user decides what the content of the mixed-media presentation will be, what types of streaming media and static media need to be created, and how the overall process will flow.

Next, as shown in box 1002, the user creates static media files 204 for use in the mixed-media file presentation system. Typically static media files 202 comprise slides, images, drawings, simulations, or other media files that complement the content of streaming media file 202.

As shown in box 1004, the user then creates one or more transcript files 206 that will be used in the streaming media file of the mixed-media presentation. These can be transcripts of videos that will be presented, or they can be transcripts of an audio-only presentation. The transcripts can then be translated into other languages. These translations create multiple sets of subtitles for the mixed-media presentation, wherein each set is in a different language. This allows users of the mixed-media presentation who are proficient in languages other than the original language of the presentation to still use the mixed-media presentation.

Turning to box 1006, the user records the streaming video or audio files for use in the mixed-media presentation. Generally a video format implies that there is associated audio, although a user can create a silent video. The transcripts generated in box 1004 are typically used when creating the video or audio files. Next, as shown in box 1008, the user converts the streaming video or audio files into different computer-readable streaming media formats, such as RealVideo, RealAudio, Quicktime, Windows Media, or any other computer-readable format. The creation of several different formats helps to ensure that the final mixed-media file presentation system will be supported by a wide variety of user platforms.

Turning to box 1010, the different streaming media files 202, static media files 202, and transcript files 206 created are sent to a server where they are made available to sync engine 224. The use of a server allows the sync engine 224 to access these files whenever needed.

As shown in box 1012, after creating all of the media files, the next step is to generate relationships between the media files. A user can accomplish this by placing information about the media files, including the media files themselves, into database 226 and then creating a directory tree structure 1112 within database 226 that relates all of the media files to one another. The process of creating a database and generating relationships among the different media files is further described with reference to FIG. 11. Alternately, an authoring tool can be used to create the relationships.

Moving to box 1014, after the relationships between the media files are generated, the next step is to deliver the information in database 226 to sync engine 224. The sync engine 224 then obtains time markers that synchronize static media files 204 and transcript files 206 to streaming media files 202.

Turning to box 1016 now, content definition files are extruded from database 226 and are delivered to a build engine of a mixed-media file presentation system.

The content definition files can be generated as an output data file from database 226 and provide information to the build engine that the build engine uses to construct a mixed-media file presentation system. The content definition files are extruded from database 226 in a format that the build engine can understand, for example Extensible Mark-Up Language (XML).

As shown in box 1018, the build engine then uses the content definition files, as well as stylesheets generated in box 1022, to generate a mixed-media file presentation system. The build engine can deploy the mixed-media file presentation system over a communications network such as an intranet or the Internet, or to a portable medium such as a CD-ROM. This is shown in box 1020.

Turning to FIG. 11, it is a graphical representation of how information is gathered and how relationships between the media files can be created.

Starting with step (a), the transcript files 206 that were created are stored in database 226. This can include the original transcript files as well as any translations. Alternately, in lieu of having database 226 store transcript files 206, database 226 can simply store information regarding the location or access paths of the transcript files 206, and the transcripts files 206 themselves can be stored elsewhere, such as on server 208 or on the user computer system 200. This alternative conserves storage space at synchronization server 216.

Next, moving to step (b), the location information of streaming media files 202 is stored in database 226. The location information is preferably in the form of access paths 202' that identify the location of streaming media files 202 on server 208. Thus, database 226 now comprises transcript files 206 as well as the access paths 202' to streaming media files 202 stored on server 208. Alternately, streaming media files 202 can be stored in database 226, rather than being stored to server 208.

Staying at step (b), as is the case with streaming media files 202, access paths 204' to static media files 204 are stored in database 226. Database 226 now comprises transcript files 206, access paths 202' to streaming media files 202, and access paths 204' to static media files 204. In alternate embodiments, static media files 204 can reside in database 226 rather than being deployed to server 208, in lieu of access paths 204' being stored in database 226.

Moving on to step (c), relationships are created that associate static media files 204 and transcript files 206 to streaming media files 202. It is these relationships that allow sync engine 224 to pull up the appropriate static media files 204 and transcript files 206 when a streaming media file 202 is chosen.

For instance, the user can first create an overall tree structure 1112 for the mixed-media presentation. As shown by the example in step (c), the overall tree structure 1112 can comprise one section 1108 with three different lessons 1110. The user can then determine which media files 206, 202, and 204 should be placed into each lesson 1110. In this example, one streaming media file 202 is being associated with each lesson 1110. Next, the corresponding transcript file 206 and a plurality of static media files 204 are associated with each lesson 1110. Generally, each of the transcript files 206 and each of the static media files 204 were originally created to be associated with a particular streaming media file 202. It is through the relationship generating process of box 1012 that the user can establish these associations for use by the sync engine 224.

Since the overall tree structure 1112 only uses access paths 202' and 204' for the streaming media 202 and static media 204 files, each media file can be used in more than one lesson 1110 or section 1108, and the user can specify this in the overall file structure 1112. This is possible because the actual media files are located on server 208, and since the actual media files are not themselves placed into the overall file structure 1112, the media files are available for use in multiple lessons 1110 or sections 1108.

Moving on to step (d), the time markers 1114 generated by the sync engine 224 are added to database 226 where they are associated with their respective static media files 204 or transcript files 206. The result of this database building process is a directory structure defining which static media files 204 and transcript files 206 are associated with which streaming media files 202, and how the media files are laid out in an overall file structure 1112.

5. Hardware Overview

Figure 12:
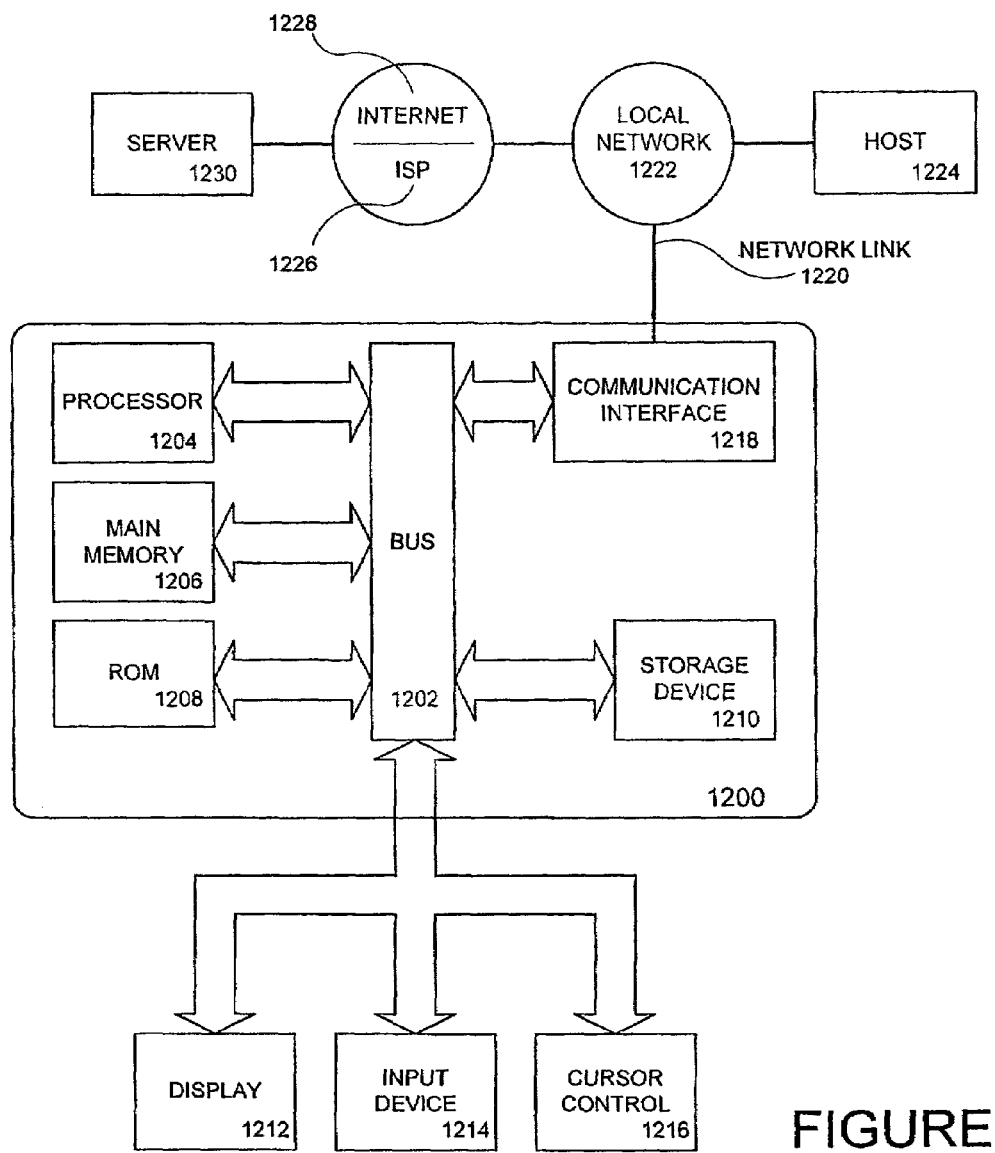
FIG. 12 illustrates an embodiment of a computer system configured to employ the invention.
Figure 1:
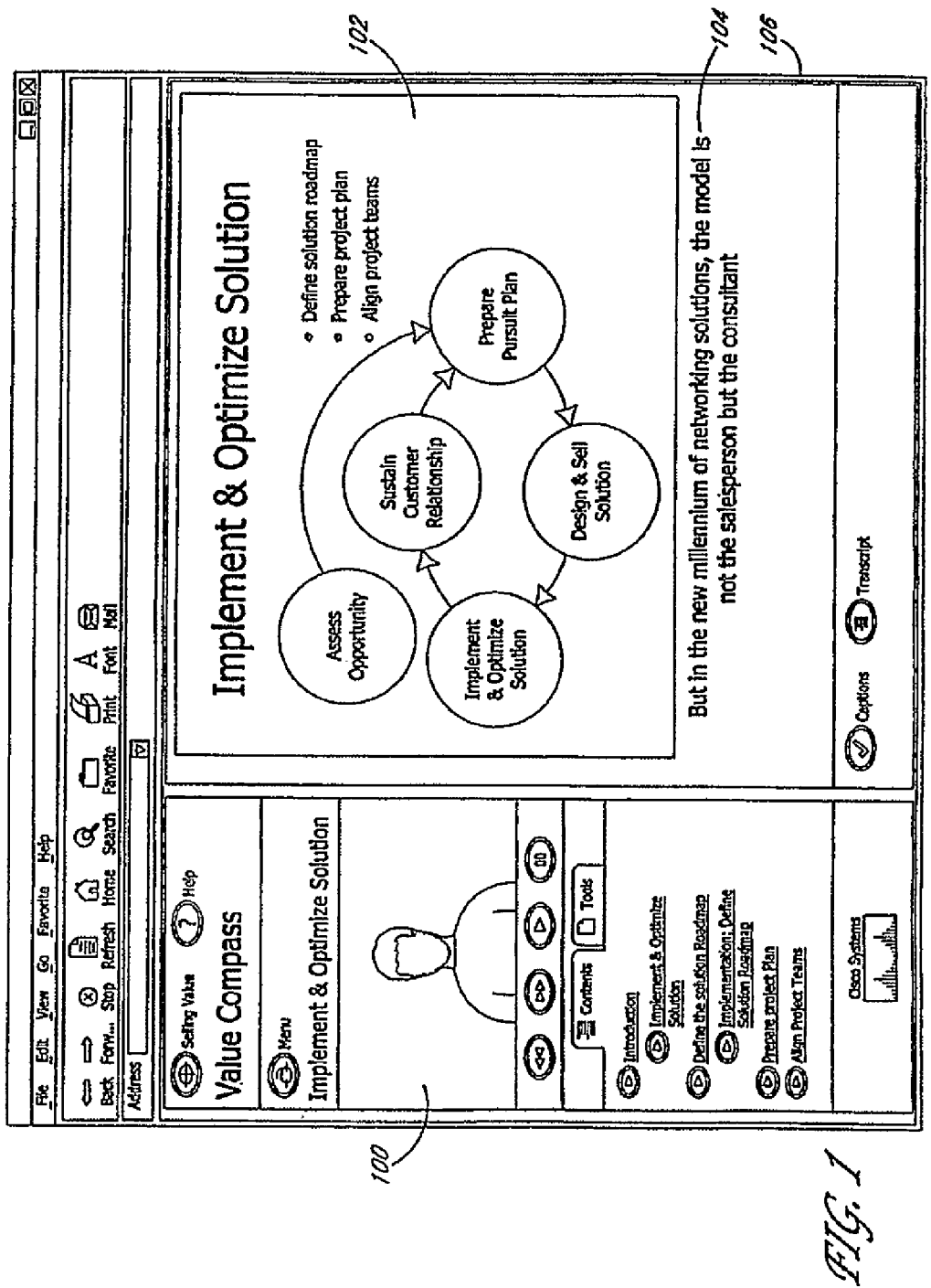
Figure 2:
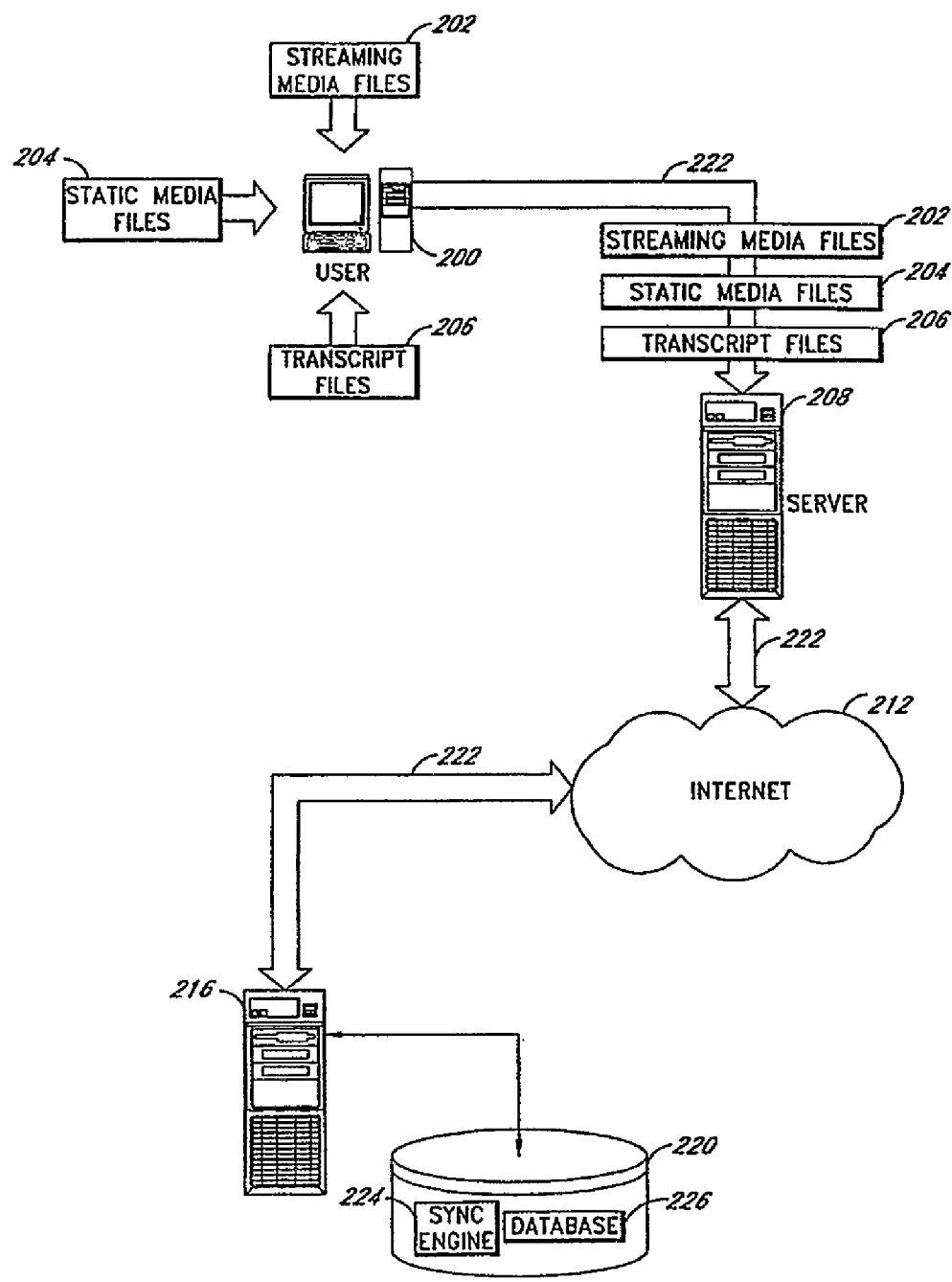
Figure 3:
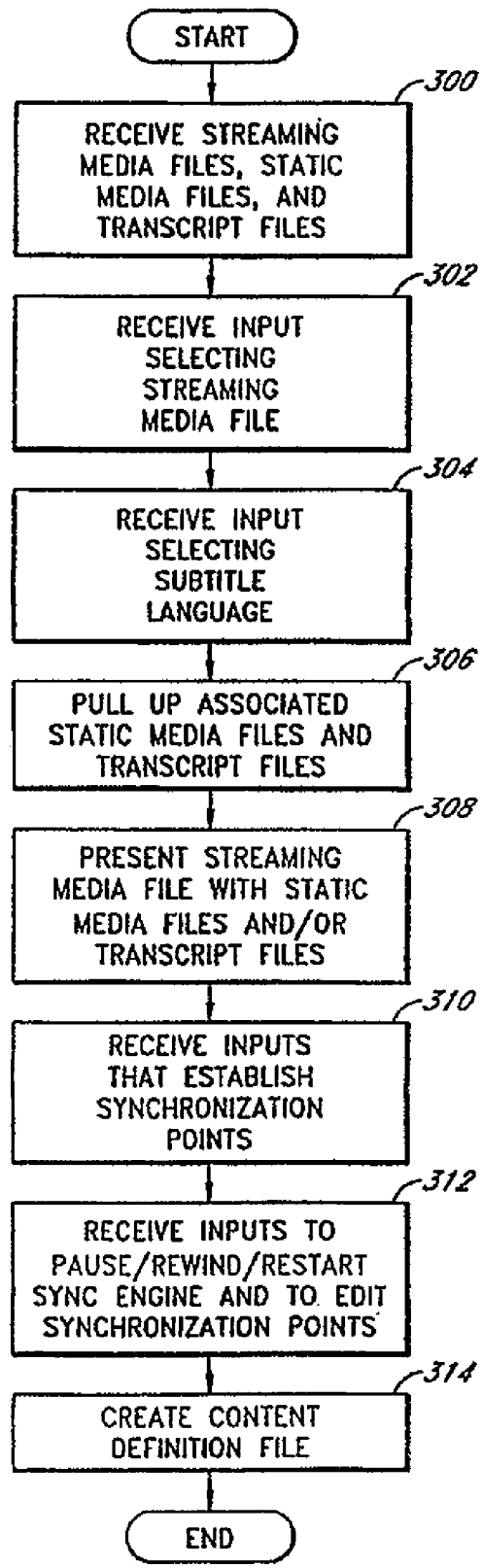
Figure 4:
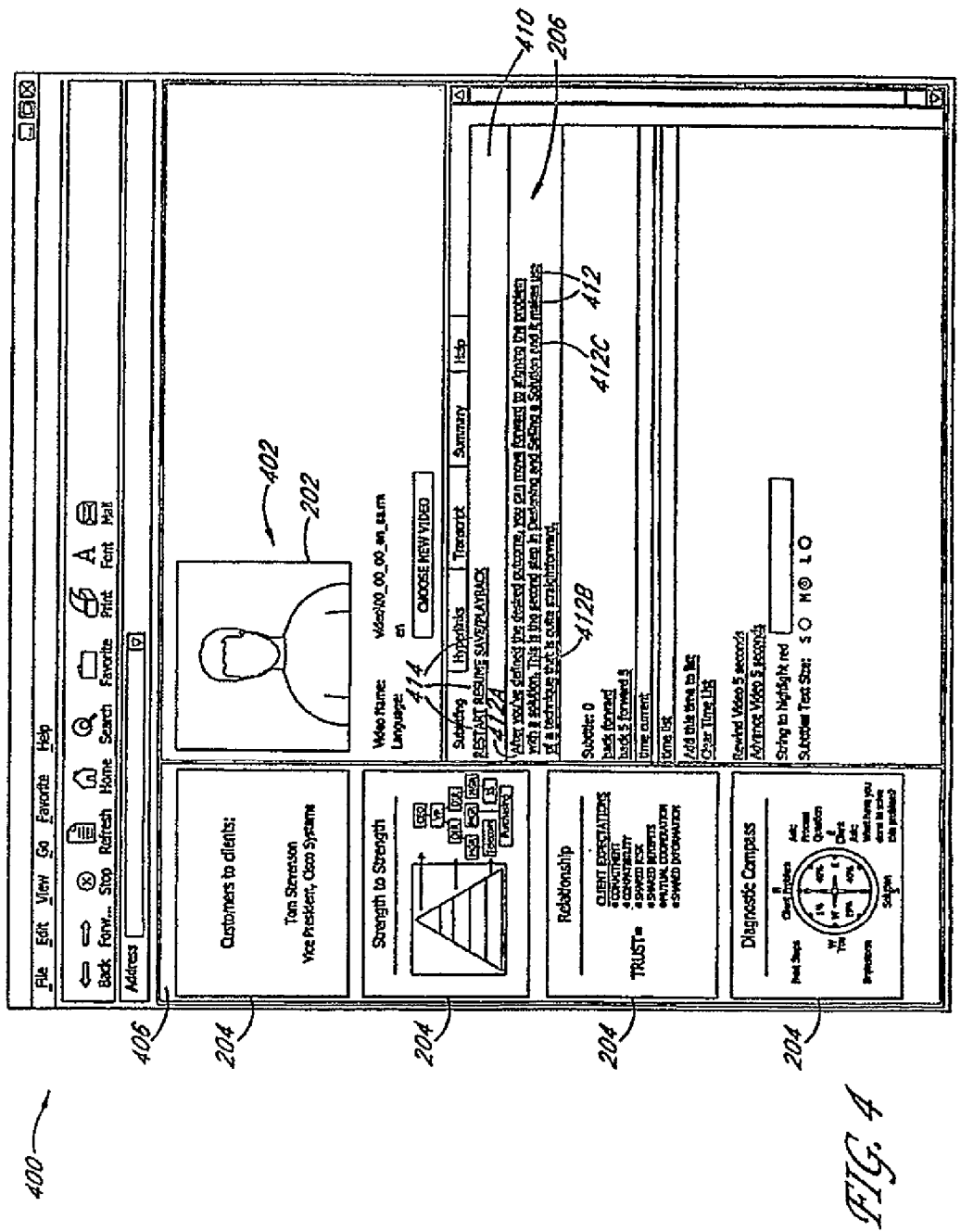
Figure 5A:
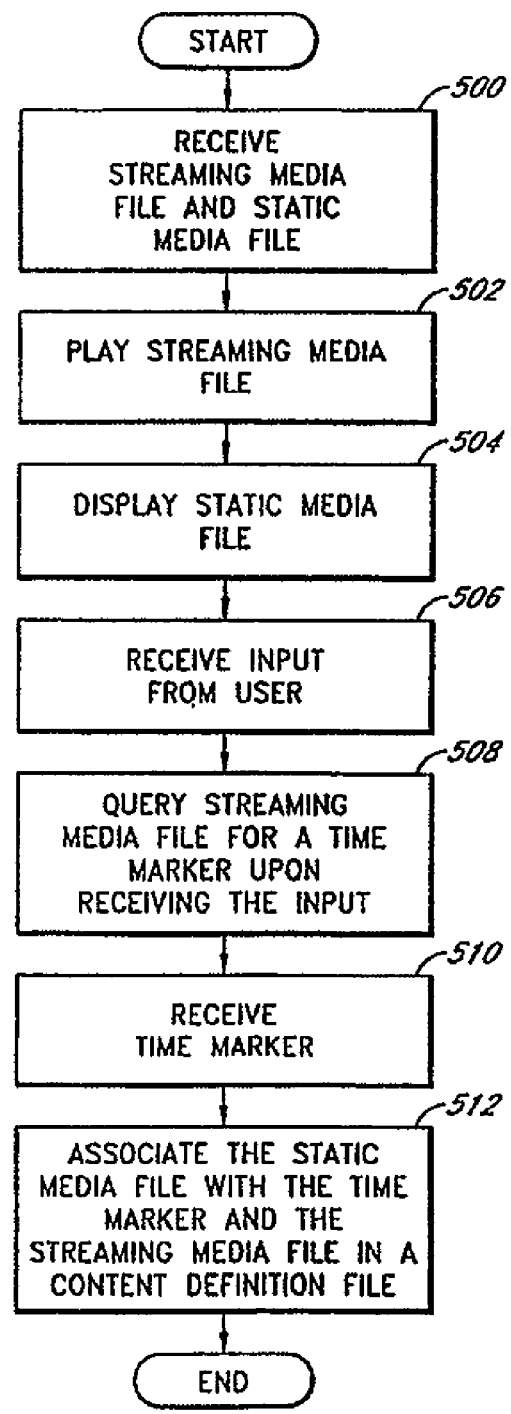
Figure 5B:
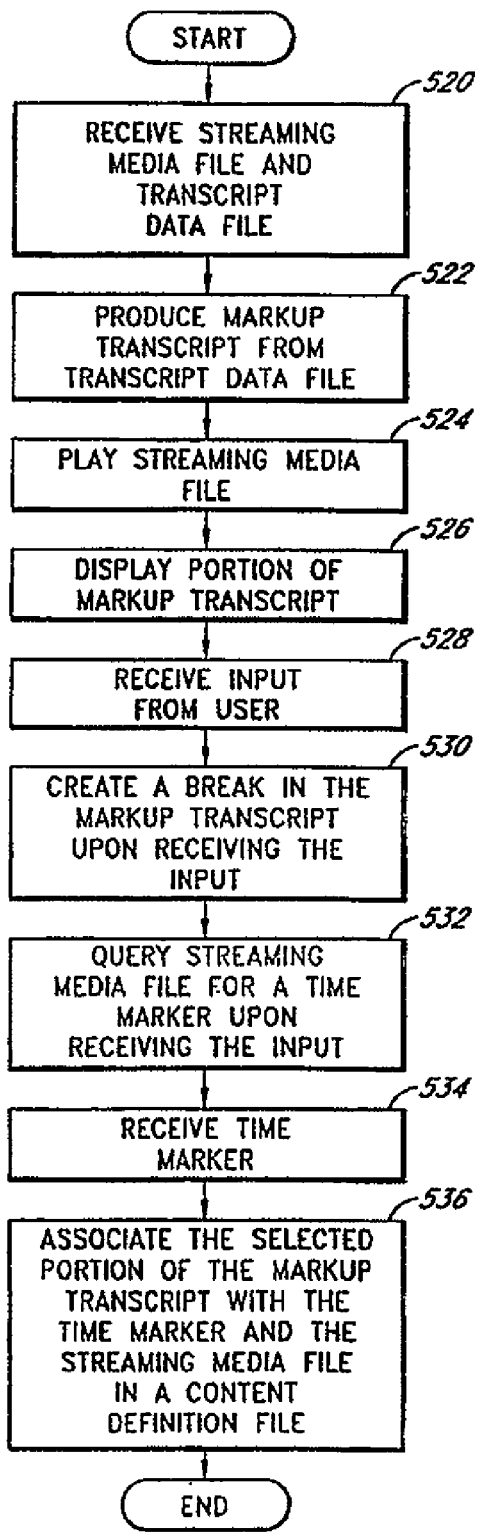
Figure 6A:
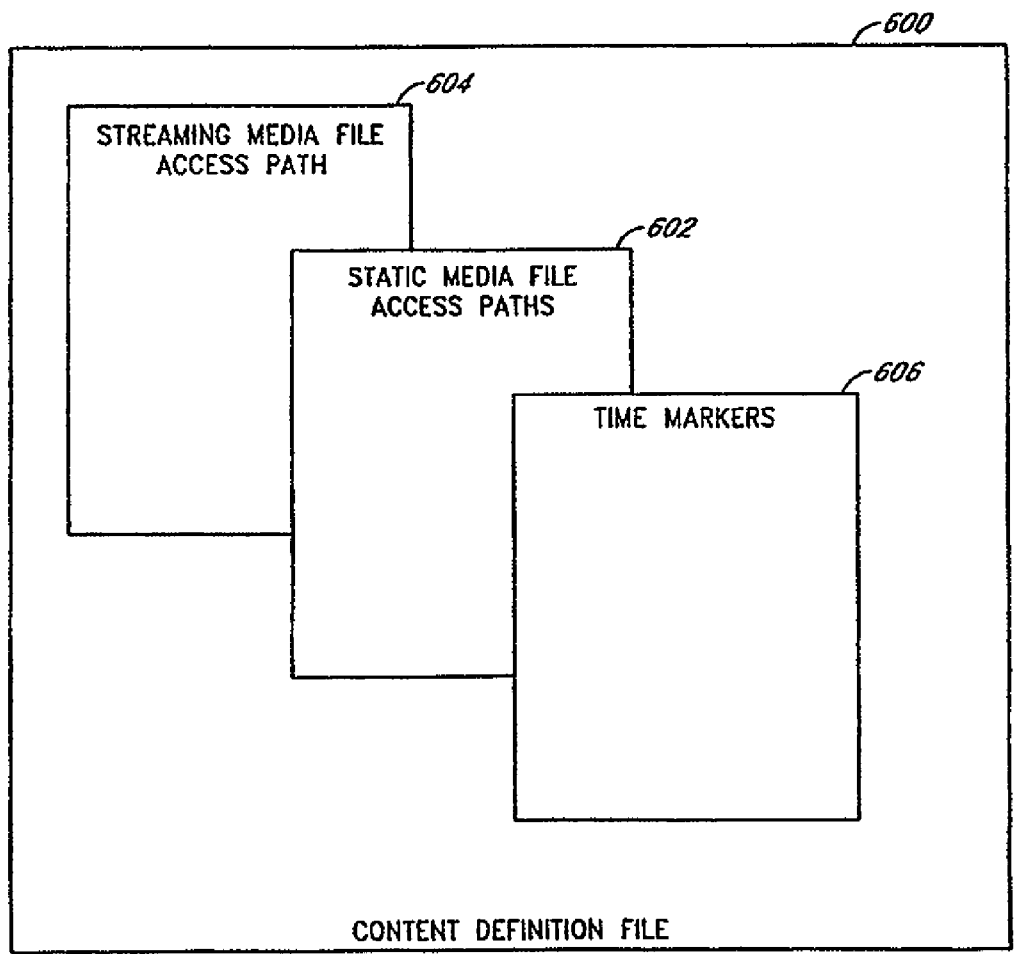
Figure 6B:
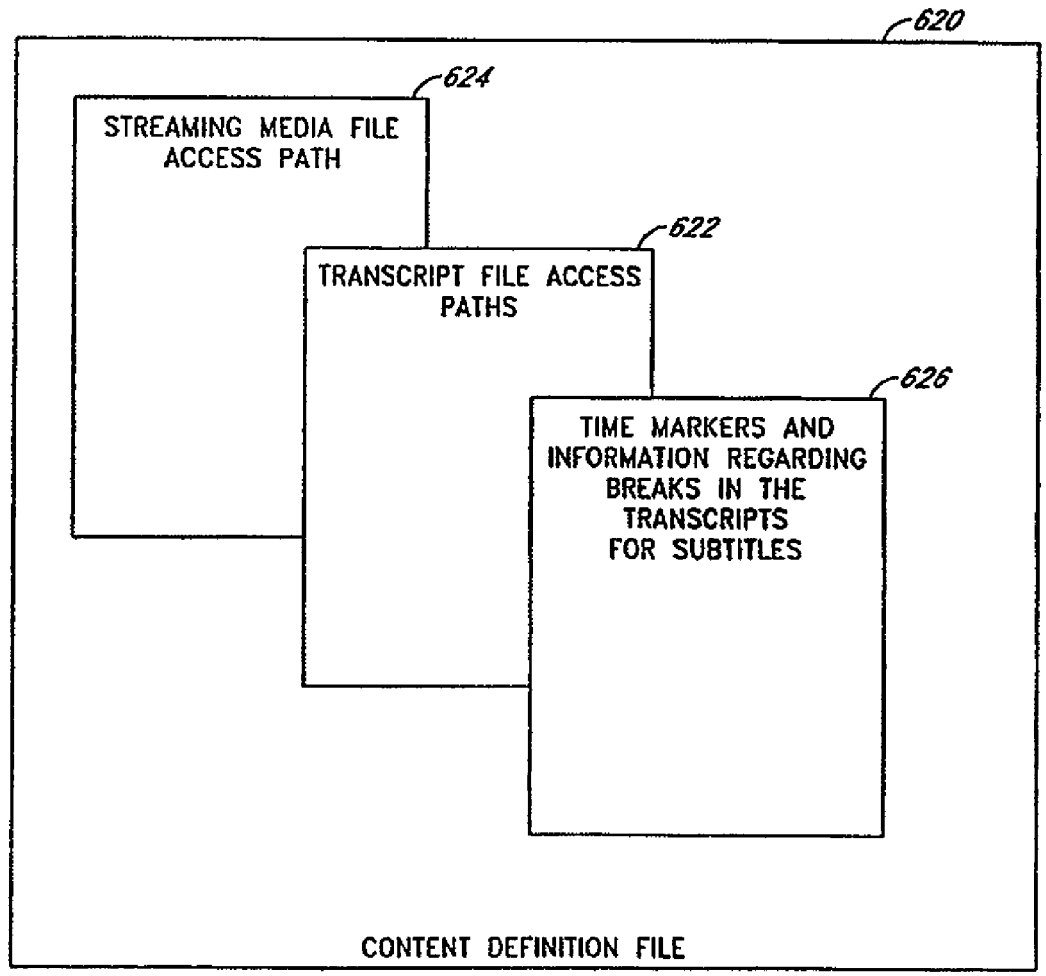
Figure 7:
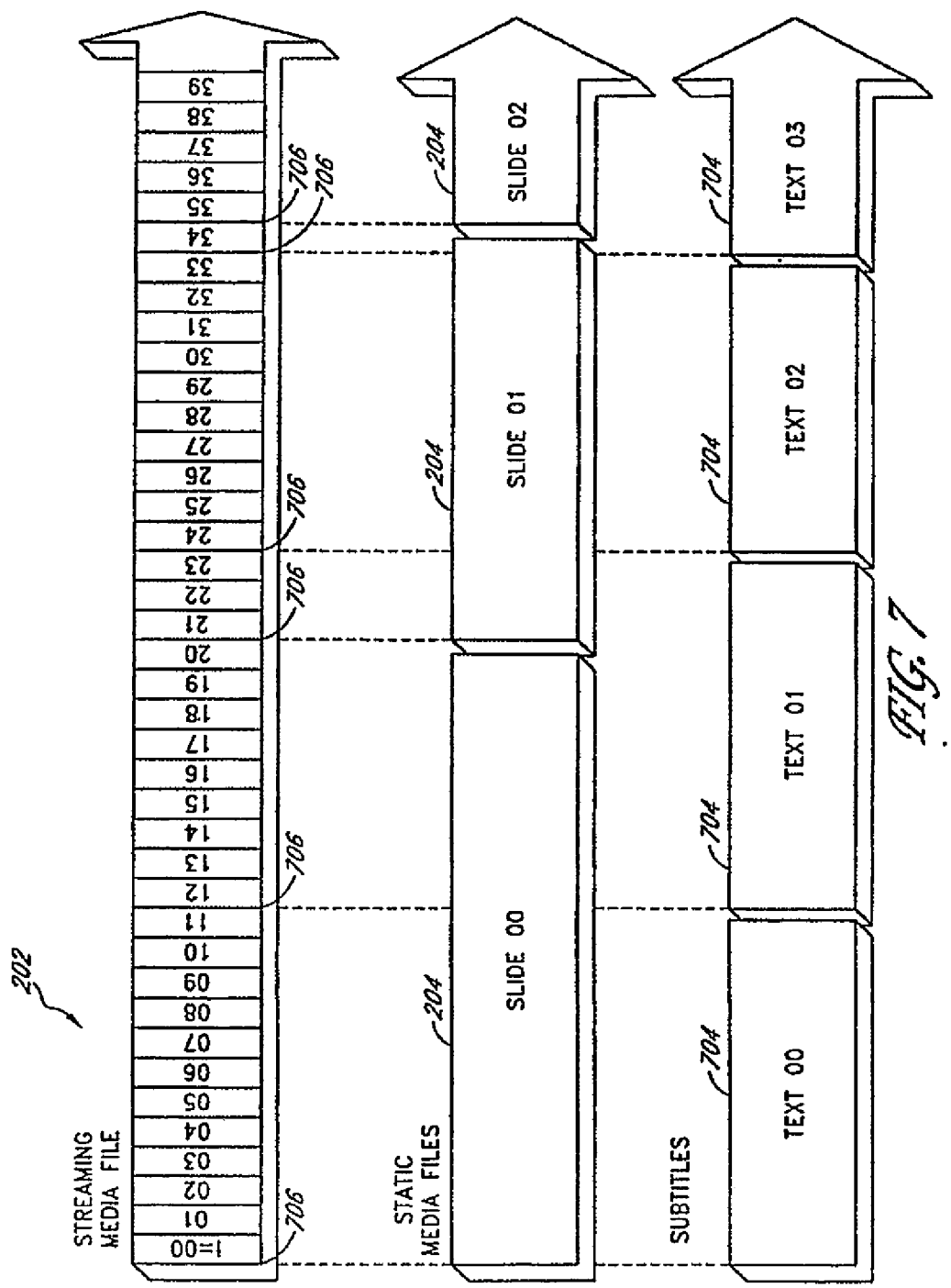
Figure 8:
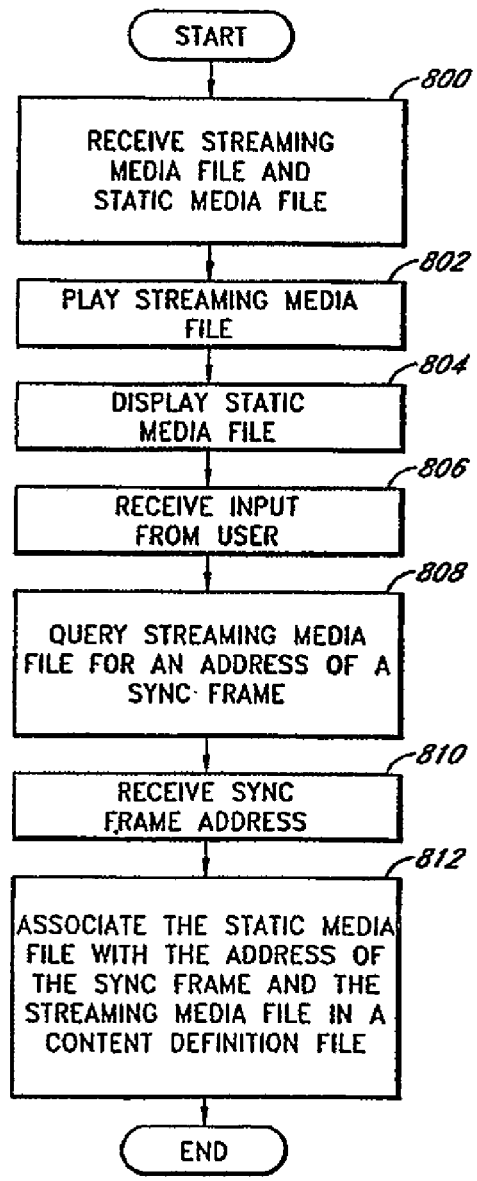
Figure 9:
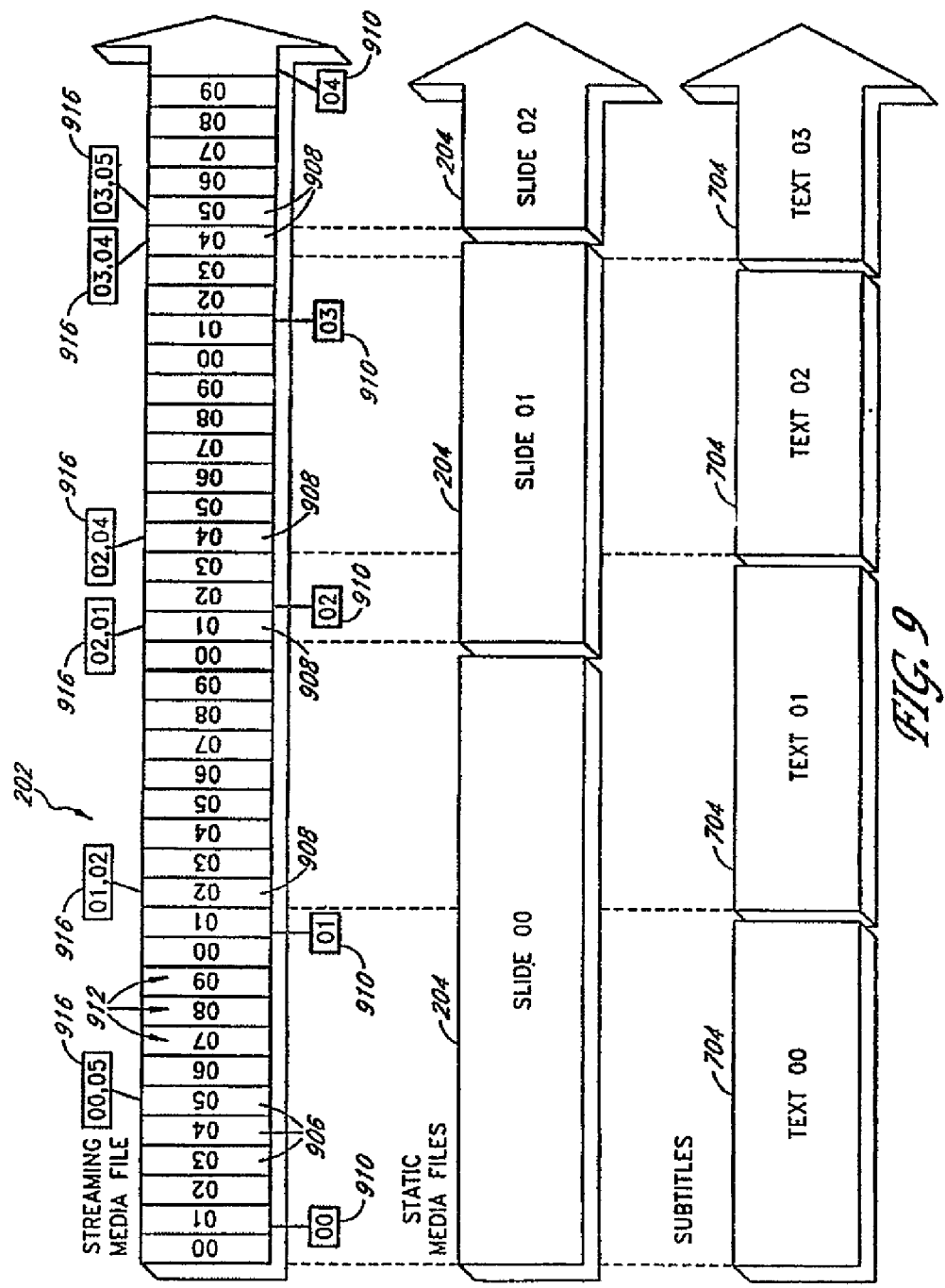
Figure 10:
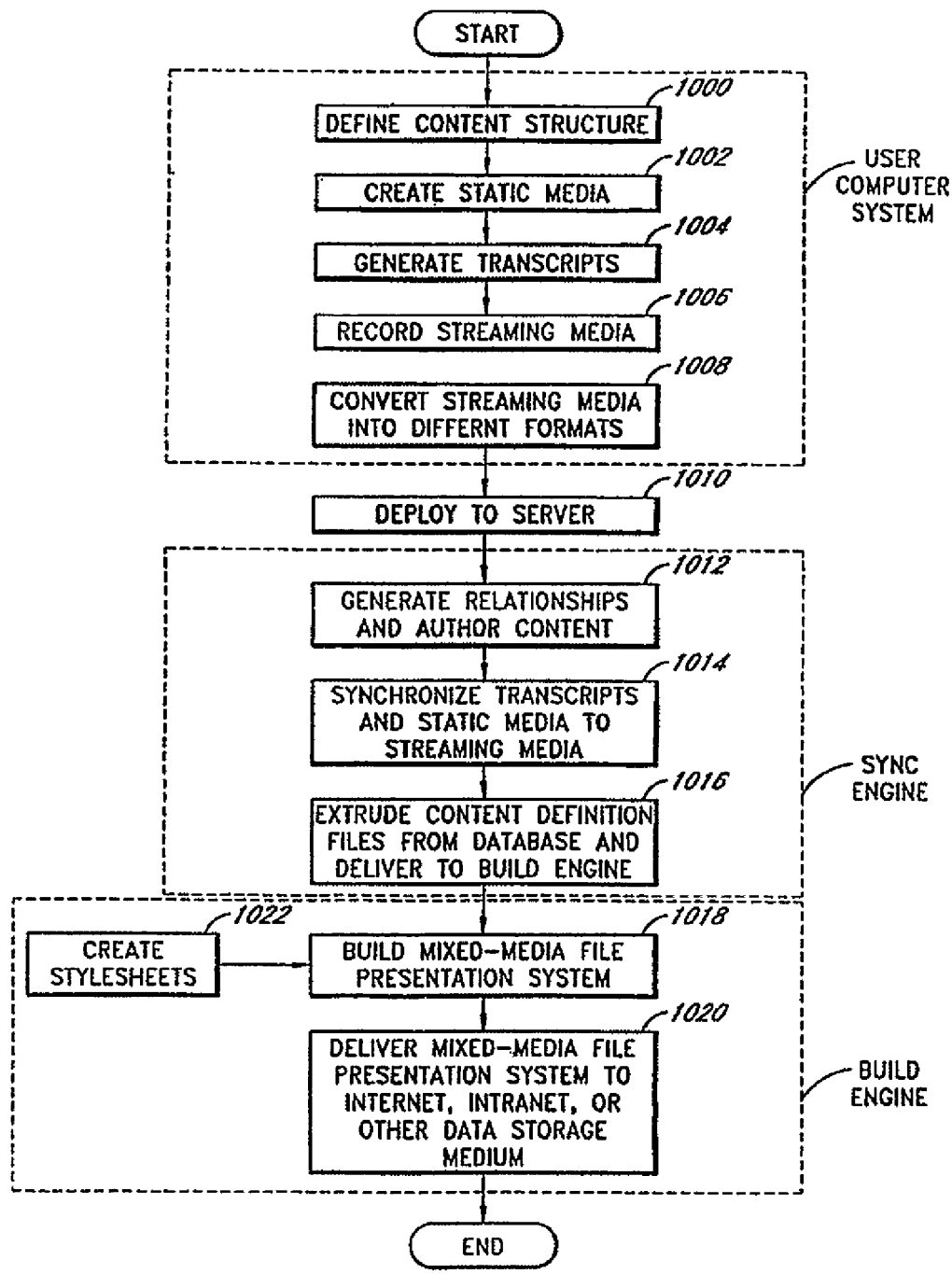
Figure 11:
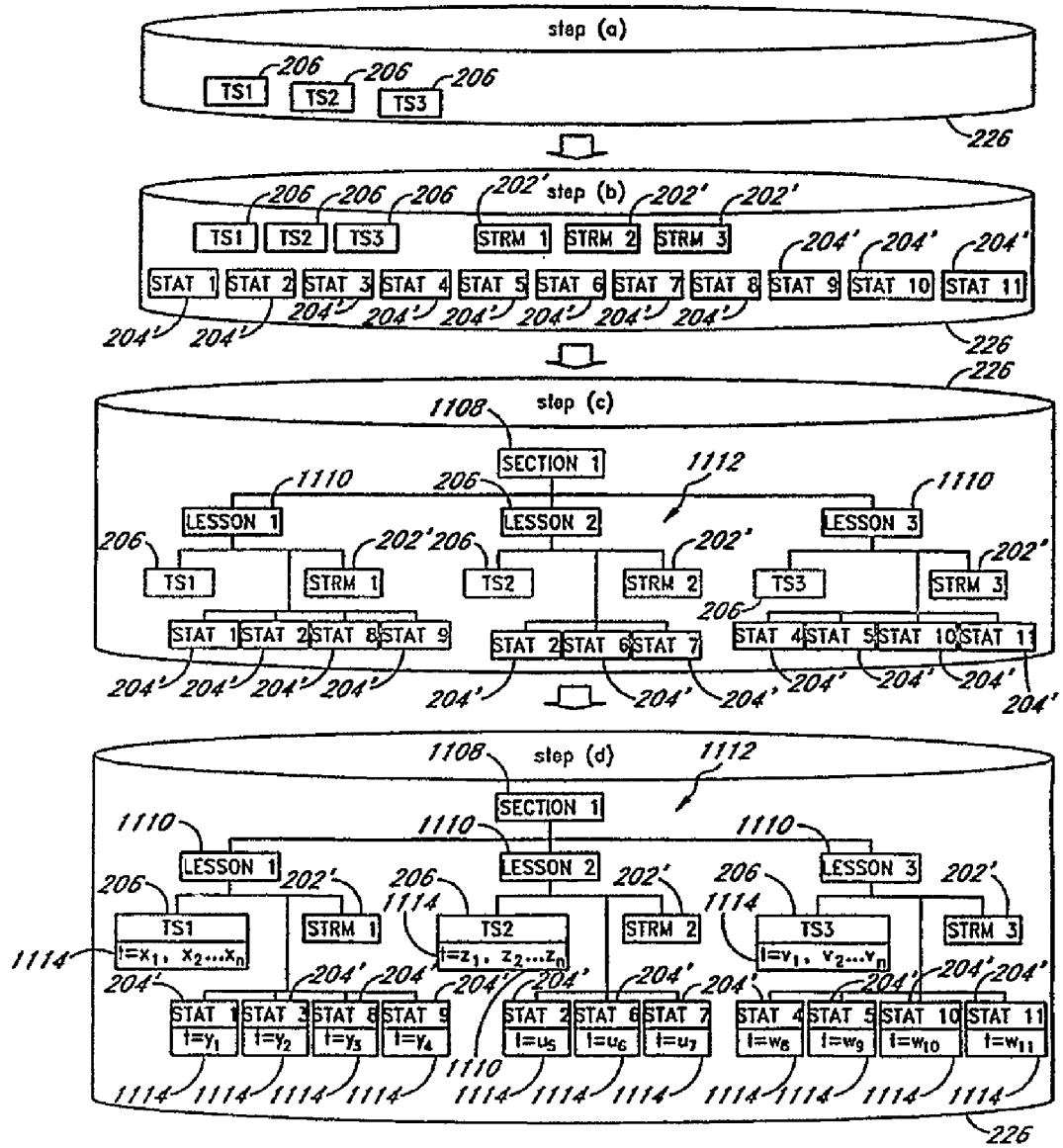
Figure 12:
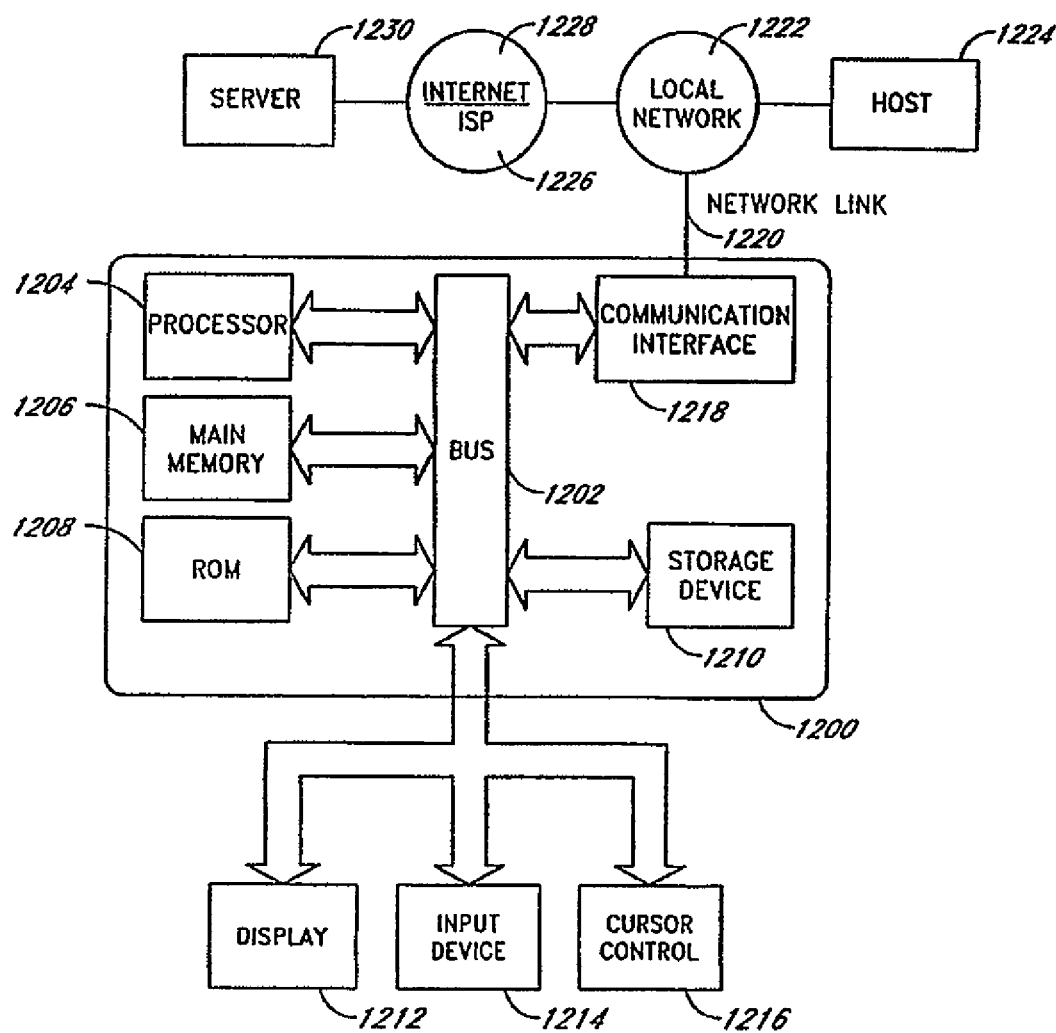

FIG. 12 is a block diagram of an exemplary computer system 1200 upon which methods of the invention can be implemented.

Computer system 1200 includes a bus 1202, or other communication mechanism for communicating information, and a processor 1204 coupled with bus 1202 for processing information. Computer system 1200 also includes a main memory 1206, such as a random access memory ("RAM"), or other dynamic (or "volatile") storage device, coupled to bus 1202. The main memory 1206 stores information and instructions executed by processor 1204 during execution. Main memory 1206 also stores temporary variables or other intermediate information during execution of instructions by processor 1206.

Computer system 1200 further includes a read only memory ("ROM") 1208 or other static (or "persistent") storage device (e.g., FLASH, PROM, EEPROM, etc.) coupled to bus 1202. The ROM 1208 stores static information and instructions for processor 1204, in particular the browser as described herein. It is worth noting that one or more banks of memory can comprise ROM 1208. A storage device 1210 (or "hard disk", or "hard drive"), such as a magnetic disk or optical disk, is coupled to bus 1202. The storage device 1210 stores information such as data structures and instructions, for example data structures for streaming media files 202 and static media files 204, or structures relating to the operating system or application programs that use the operating system.

Computer system 1200 is preferably coupled via bus 1202 to a display device 1212, such as a cathode ray tube ("CRT") or an active or passive-matrix display. The display 1212 presents images to an end-user. An input device 1214, including alphanumeric and other keys, is coupled to bus 1202. The input device 1214 communicates information and command selections to processor 1204. Another type of user input device is cursor control 1216, such as a mouse, a trackball, or cursor direction keys, for communicating direction information and command selections to processor 1204 and for controlling cursor movement on display 1212. This input device 1214 typically has two degrees of freedom in two axes, a first axis (e.g., x) and a second axis (e.g., y), that allows the device to specify positions in a plane.

According to an aspect of the invention, the processor 1204 in the computer system 1200 executes one or more sequences of instructions contained in main memory 1206. Such instructions are read into main memory 1206 from another computer-readable medium, such as storage device 1210 or ROM 1208. The instructions can be executable object code or interpreted code that is processed by a run-time engine (e.g., Javascript).

Execution of the sequences of instructions contained in main memory 1206 causes processor 1204 to perform the methods of the invention as described herein. In alternative embodiments, hard-wired circuitry can be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium can take many forms, including but not limited to, non-volatile media, volatile media, and transmission media. Non-volatile media includes, for example, optical or magnetic disks, such as storage device 1210. Volatile media includes dynamic memory, such as main memory 1206.

Transmission media includes coaxial cables, copper wire and fiber optics, including the wires that comprise bus 1202. Transmission media can also take the form of acoustic or light waves, such as those generated during radio-wave and infrared data communications.

Common forms of computer-readable media include, a floppy disk, a flexible disk, a hard disk, a magnetic tape, or any other magnetic media, a CD-ROM, any other optical media, punchcards, a paper-tape, any other physical media with patterns of holes, a RAM, a ROM, a FLASH, or any other memory chip or cartridge, a carrier wave as described hereinafter, or any other media from which a computer can read.

Various forms of computer-readable media can be involved in carrying one or more sequences of one or more instructions to processor 1204 for execution. For example, the instructions can initially be carried on a magnetic disk of a remote computer. The remote computer can load the instructions into its dynamic memory and send the instructions over a telephone line using a modem. A modem local to computer system 1200 can receive the data on the telephone line and use an infrared transmitter to convert the data to an infrared signal. An infrared detector coupled to bus 1202 can receive the data carried in the infrared signal and place the data on bus 1202. Bus 1202 carries the data to main memory 1206, from which processor 1204 retrieves and executes the instructions. The instructions received by main memory 1206 can optionally be stored on storage device 1210 before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 can be an integrated services digital network ("ISDN") card or a modem to provide a data communication connection to a corresponding type of telephone line. As another example, communication interface 1218 can be a local area network ("LAN") card to provide a data communication connection to a compatible LAN. Wireless links can also be implemented. In any such implementation, communication interface 1218 sends and receives electrical, electromagnetic or optical signals that carry digital data streams representing various types of information.

Network link 1220 preferable provides data communication through one or more networks to other data devices. For example, network link 1220 can provide a connection through local network 1222 to a host computer 1224 or to data equipment operated by an Internet Service Provider ("ISP") 1226. ISP 1226 in turn provides data communication services through the "Internet" 1228—for example computer diagnostic services. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit requested code for an application program through Internet 1228, ISP 1226, local network 1222 and communication interface 1218—for example using the FTP protocol. In accordance with the invention, one such downloaded application is executable software code or computer configuration parameters that perform the methods of the invention.

The received code can be executed by processor 1204 as it is received, and/or stored in main memory 1206, storage device 1210, or other non-volatile storage for later execution. In this manner, computer system 1200 can obtain application code in the form of a carrier wave.

Methods and apparatus for synchronizing media files to enable them to be concurrently presented in a mixed-media file presentation system have been disclosed. In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than restrictive sense.

What is claimed is:

1. A method for synchronizing and presenting media files as a mixed-media presentation, the method comprising:
   receiving a streaming media file;
   receiving a static media file;
   receiving at least two transcript files that include data which may be used to display text associated with the streaming media file, wherein each of the transcript files is associated with a different language;
   associating the static media file with a time marker and the streaming media file in an output file;
   associating each of the at least two transcript files with a time marker and the streaming media file in the output file; and
   after associating, providing the output file and an indication of a selected language that is associated with one of the transcript files to a mixed-media presentation system, wherein the mixed-media presentation system accesses the output file to dynamically synchronize the static media file with the streaming media file and the transcript file that is associated with the selected language while presenting the mixed-media presentation on a display device.

2. The method of claim 1, further comprising receiving an input that designates a point in the streaming media file to which the static media file is to be synchronized.

3. The method of claim 1, wherein the time marker indicates a quantity of time that has elapsed.

4. The method of claim 3, wherein the quantity of time is measured between a first point in time, relating to when the streaming media file started playing, and a second point in time, relating to when user input was received.

5. The method of claim 1, further comprising displaying the streaming media file synchronized with one or more static media files based upon one or more associations in the output file.

6. The method of claim 1, wherein the streaming media file is selected from the group consisting of video data files and audio data files.

7. The method of claim 1, further comprising producing a streaming output from the streaming media file, wherein the streaming output is selected from the group consisting of streaming video and streaming audio.

8. The method of claim 1, wherein the static media file is selected from the group consisting of graphic data files, text data files, and non-streaming animation files.

9. The method of claim 1, wherein the transcript file that is associated with the selected language includes subtitles in the selected language that are associated with the streaming media file.

10. A computer-readable storage medium having stored therein one or more sequences of instructions for synchronizing media files for a mixed-media file presentation, the one or more sequences of instructions causing one or more processors to perform a number of acts, said acts comprising:
  receiving a streaming media file;
  receiving a static media file;
  receiving a plurality of transcript files that include text associated with the streaming media file, wherein the text of each transcript file is in a different language;
  associating the static media file with a time marker and the streaming media file in an output file;
  associating each transcript file with a time marker and the streaming media file in the output file; and
  after associating, providing the output file to a mixed-media presentation system together with an indication of a selected language, wherein the mixed-media presentation system accesses the output file to dynamically synchronize the static media file and at least one of the transcript files that includes text in the selected language with the streaming media file while presenting the mixed-media presentation on a display device.

11. The computer-readable storage medium of claim 10, the acts further comprising receiving an input that designates a point in the streaming media file to which the static media file is to be synchronized.

12. The computer-readable storage medium of claim 10, wherein the time marker indicates a quantity of time that has elapsed.

13. The computer-readable storage medium of claim 12, wherein the quantity of time is measured between a first point in time, relating to when the streaming media file started playing, and a second point in time, relating to when a user input was received.

14. The computer-readable storage medium of claim 10, the acts further comprising displaying the streaming media file synchronized with one or more static media files based upon one or more associations in the output file.

15. The computer-readable storage medium of claim 10, wherein the streaming media file is selected from the group consisting of video data files and audio data files.

16. The computer-readable storage medium of claim 10, the acts further comprising producing a streaming output from the streaming media file, wherein the streaming output is selected from the group consisting of streaming video and streaming audio.

17. The computer-readable storage medium of claim 10, wherein the static media file is selected from the group consisting of graphic data files, text data files, and non-streaming animation files.

18. The computer-readable storage medium of claim 10, wherein each transcript file includes subtitles in a different language, the subtitles being associated with the streaming media file.

19. A method for synchronizing and presenting media files as a mixed-media presentation, the method comprising:
  receiving a streaming media file;
  receiving a static media file;
  receiving at least two transcript files that are each associated with a different language;
  associating synchronization points related to the streaming media file and the static media file with content definition file time markers in a content definition file;
  associating synchronization points related to the streaming media file and the transcript files with content definition file markers in the content definition file;
  receiving an input indicative of a transcript language associated with one of the transcript files; and
  presenting said mixed-media presentation, including subtitles in said selected transcript language, on a display device, wherein the mixed-media presentation is synchronized without altering the streaming media file.

20. The method of claim 19, further comprising receiving an input that designates a point in the streaming media file to which the static media file is to be synchronized.

21. The method of claim 19, further comprising displaying the output of the streaming media file synchronized with one or more static media files based upon the content definition file.

* * * * *

UNITED STATES PATENT AND TRADEMARK OFFICE
CERTIFICATE OF CORRECTION

PATENT NO. : 7,096,416 B1
APPLICATION NO. : 09/699798
DATED : August 22, 2006
INVENTOR(S) : Smith et al.

It is certified that error appears in the above-identified patent and that said Letters Patent is hereby corrected as shown below:

Please replace all existing Drawings with these new attached Drawings.

Signed and Sealed this

Twentieth Day of February, 2007

JON W. DUDAS
*Director of the United States Patent and Trademark Office*